United States Patent
Usami et al.

(10) Patent No.: US 10,947,061 B2
(45) Date of Patent: Mar. 16, 2021

(54) CONVEYING SYSTEM

(71) Applicants: Kabushiki Kaisha Toshiba, Minato-ku (JP); Toshiba Infrastructure Systems & Solutions Corporation, Kawasaki (JP)

(72) Inventors: Yusuke Usami, Ota (JP); Shota Nagafuchi, Shinagawa (JP); Hidenari Mori

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/579,410

(22) Filed: Sep. 23, 2019

(65) Prior Publication Data

US 2020/0031593 A1    Jan. 30, 2020

Related U.S. Application Data

(63) Continuation of application No. PCT/JP2018/001455, filed on Jan. 18, 2018.

(30) Foreign Application Priority Data

Mar. 23, 2017    (JP) .............................. JP2017-057013

(51) Int. Cl.
*B65G 47/90* (2006.01)
*B65G 61/00* (2006.01)
(Continued)

(52) U.S. Cl.
CPC .......... *B65G 47/905* (2013.01); *B25J 9/0093* (2013.01); *B65G 37/00* (2013.01); *B65G 61/00* (2013.01)

(58) Field of Classification Search
CPC ........ B65G 47/90; B65G 47/53; B65G 61/00; B65G 47/905; B65G 37/00; B25J 13/08; B25J 9/1697; B25J 9/1694; B25J 9/0093
See application file for complete search history.

(56) References Cited

U.S. PATENT DOCUMENTS 5,299,693 A * 4/1994 Ubaldi .................. B07C 5/3412
198/341.05
8,825,212 B2 * 9/2014 Irie ........................ B25J 9/1687
700/213

(Continued)

FOREIGN PATENT DOCUMENTS

DE    20 2016 007 919 U1    4/2017
EP        0 995 704 A1    4/2000

(Continued)

OTHER PUBLICATIONS

Partial Supplementary European Search Report dated Apr. 29, 2020 in European Patent Application No. 18771713.7, citing documents AO-AT therein, 16 pages.

*Primary Examiner* — James R Bidwell
(74) *Attorney, Agent, or Firm* — Oblon, McClelland, Maier & Neustadt, L.L.P.

(57) ABSTRACT

A conveying system includes a robot apparatus, a second conveyor, and a controller. The robot apparatus has a holding unit configured to hold a package, and an arm configured to move the holding unit, and is located next to a first conveyor extending in a first direction, in a second direction, which is different from the first direction. The second conveyor is located next to the robot apparatus, in the first direction, and is configured to convey the package in the second direction toward the first conveyor. The controller is configured to control the robot apparatus so as to retrieve the (Continued)

package from an accumulation unit for the package and place the retrieved package on the second conveyor.

11 Claims, 18 Drawing Sheets

(51) Int. Cl.
  B65G 37/00 (2006.01)
  B25J 9/00 (2006.01)

(56) References Cited

U.S. PATENT DOCUMENTS

| | | | |
|---|---|---|---|
| 9,238,304 B1* | 1/2016 | Bradski | G06T 7/593 |
| 2007/0272515 A1 | 11/2007 | Yohe et al. | |
| 2009/0312865 A1* | 12/2009 | Bonnain | B65G 47/082 |
| | | | 700/230 |
| 2016/0137435 A1 | 5/2016 | Tanaka et al. | |
| 2017/0043986 A1* | 2/2017 | Ducharme | B65G 57/035 |
| 2019/0202069 A1* | 7/2019 | Bando | B25J 11/0045 |

FOREIGN PATENT DOCUMENTS

| | | |
|---|---|---|
| JP | 60-161832 A | 8/1985 |
| JP | 5-208731 A | 8/1993 |
| JP | 5-278854 A | 10/1993 |
| JP | 6-255772 A | 9/1994 |
| JP | 2001-151347 A | 6/2001 |
| JP | 2007-130711 A | 5/2007 |
| JP | 2015-40118 A | 3/2015 |
| JP | 2016-55995 A | 4/2016 |
| JP | 2016-94280 A | 5/2016 |

\* cited by examiner

CONVEYING SYSTEM

CROSS-REFERENCE TO RELATED APPLICATION(S)

This application is based upon and claims the benefit of priority from Japanese Patent Application No. 2017-057013 filed Mar. 23, 2017, the entire contents of which are incorporated herein by reference. This application is a continuation application of International Application No. PCT/JP2018/001455 filed on Jan. 18, 2018.

FIELD

Embodiments of the present invention relate to a conveying system.

BACKGROUND

In logistics centers and the like, there are known conveying systems that include robot apparatuses for retrieving collected packages and conveying them to destinations such as belt conveyors. Such conveying systems are required to have higher conveying speed.

DESCRIPTION OF EMBODIMENTS

Figure 1:
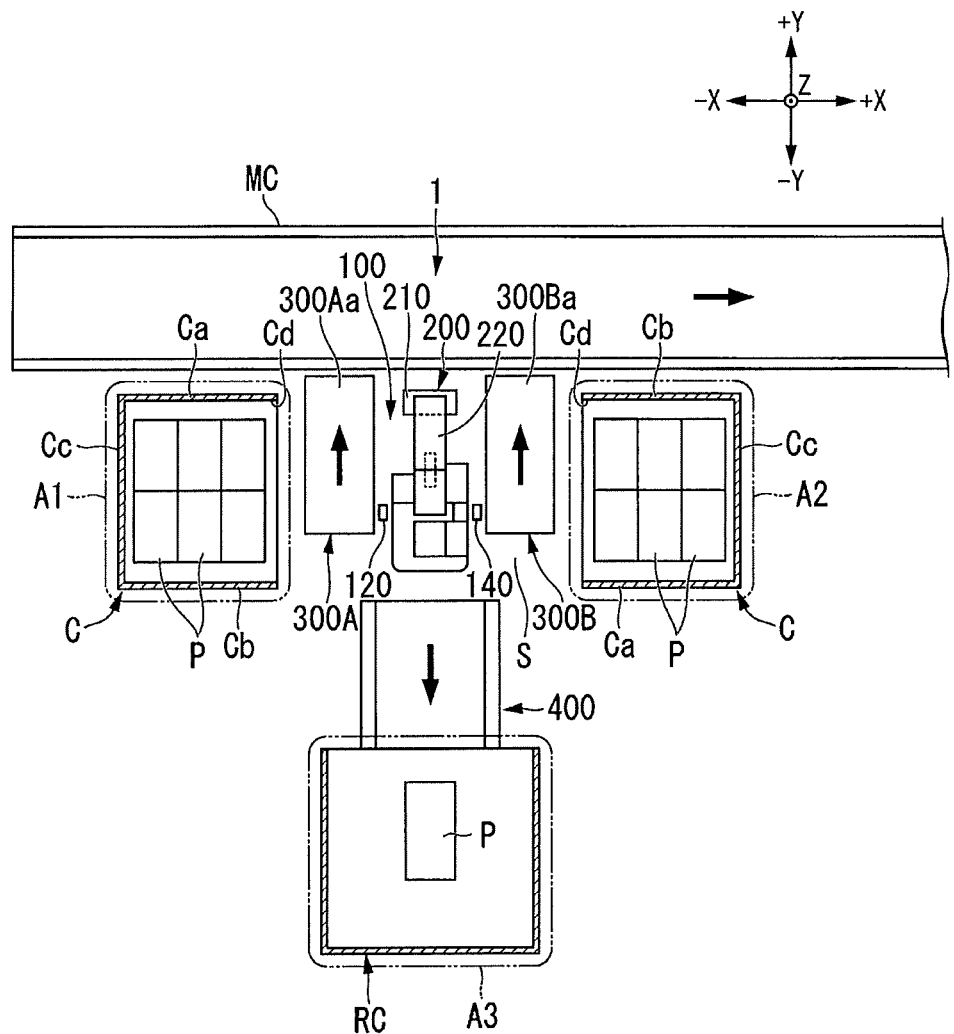
FIG. 1 is a plan view showing a conveying system of a first embodiment.

A conveying system of an embodiment includes a robot apparatus, a second conveyor, and a controller. The robot apparatus has a holding unit configured to hold a package, and an arm configured to move the holding unit, and is located next to a first conveyor extending in a first direction, in a second direction, which is different from the first direction. The second conveyor is located next to the robot apparatus, in the first direction, and is configured to convey the package in the second direction toward the first conveyor. The controller is configured to control the robot apparatus so as to retrieve the package from an accumulation unit for the package and place the retrieved package on the second conveyor.

Hereinafter, a conveying system of the embodiment will be described with reference to the drawings. In the description below, constituent elements having the same or similar functions are denoted by the same reference numerals. A description of such constituent elements may not be repeated. The term "based on XX" in the present application means "based on at least XX", and also includes "based on not only XX but also other elements". Furthermore, "based on XX" is not limited to a case in which XX is directly used, and also includes a case in which an element obtained by performing calculation or processing on XX is used. "XX" is any element (e.g., any detection result, set value, index, physical value, or other information).

Furthermore, a +X direction, a −X direction, a +Y direction, a −Y direction, and a Z direction are defined in advance. The +X direction, the −X direction, the +Y direction, and the −Y direction are directions that extend along a horizontal plane. The −X direction is a direction opposite to the +X direction. When the +X direction and the −X direction are not distinguished from each other, they are simply referred to as X directions. The +Y direction and the −Y direction are directions that intersect (e.g., that are substantially orthogonal to) the X direction. The −Y direction is a direction opposite to the +Y direction. When the +Y direction and the −Y direction are not distinguished from each other, they are simply referred to as Y directions. The Z direction is a vertical direction. The X direction is an example of the "first direction". The Y direction is an example of the "second direction".

First Embodiment

First, an example of an installation environment in which a conveying system 1 of an embodiment is installed will be described.

FIG. 1 is a plan view showing the conveying system 1 of the first embodiment. The conveying system 1 of this embodiment is installed in logistics centers and the like, and is, for example, an unloading apparatus for conveying a package from a container in which the package is accommodated, to a conveyor from which the package is discharged.

As shown in FIG. 1, the installation environment in which the conveying system 1 is installed has, for example, a main conveyor MC, a first collected package arrangement area A1, a second collected package arrangement area A2, and a package recovery area A3.

The main conveyor MC extends, for example, in the X direction. The main conveyor MC conveys a package P placed on the main conveyor MC, in the +X direction. In this embodiment, the main conveyor MC is a discharge conveyor for discharging a package P that has been unloaded by the conveying system 1, to undergo processing on the downstream side.

The first collected package arrangement area A1 and the second collected package arrangement area A2 are arranged distanced apart from each other by a predetermined distance in the X direction. In this example, the term "area" means a face, and means, for example, a placement face on which a later-described container C is placed. Each of the first collected package arrangement area A1 and the second collected package arrangement area A2 is located next to the main conveyor MC, in the Y direction. A container (package container) C accommodating a plurality of packages P is transported from the outside into each of the first collected package arrangement area A1 and the second collected package arrangement area A2. A container C arranged in the first collected package arrangement area A1 is an example of a "first accumulation unit". A container C arranged in the second collected package arrangement area A2 is an example of a "second accumulation unit". A plurality of packages P accommodated in the container C may be referred to as "collected packages". The container C is, for example, a box pallet or another type of pallet. Note that the container C is not limited to these examples, as long as the packages P can be accommodated in or placed on the container C.

In this embodiment, the container C, when viewed from above, has a first side wall Ca, a second side wall Cb, and a rear wall Cc, and also has an opening Cd at which the front portion is open. The term "wall" in the present application (e.g., the first side wall Ca, the second side wall Cb, or the rear wall Cc) is not limited to a wall in the shape of a plate, and also includes, for example, a partition in the form of a fence or a lattice. The container C is arranged in each of the first collected package arrangement area A1 and the second collected package arrangement area A2 such that the opening Cd is oriented toward an area S between the first collected package arrangement area A1 and the second collected package arrangement area A2. That is to say, the internal portion of the container C arranged in the first collected package arrangement area A1 is open in the +X direction via the opening Cd. Meanwhile, the internal portion of the container C arranged in the second collected package arrangement area A2 is open in the −X direction via the opening Cd.

The package recovery area A3 is located on the opposite side of the main conveyor MC, with respect to the area S between the first collected package arrangement area A1 and the second collected package arrangement area A2. A recovery container RC is arranged in the package recovery area A3. The recovery container RC is an example of a "package recovery unit". Among the plurality of packages P accommodated in the containers C, packages P not satisfying a predetermined condition (first condition) are collected to the recovery container RC. The state of "not satisfying a predetermined condition" is, for example, a state in which the size, the weight, the type, or the like of a package P makes it impossible to handle the package P in downstream processing of the main conveyor MC. In this embodiment, an example will be described in which, if the size of a package P (e.g., largest dimension of the package P) is greater than a predetermined size, the package P is treated as a package not satisfying the predetermined condition.

Next, the conveying system 1 of this embodiment will be described.

Figure 2:
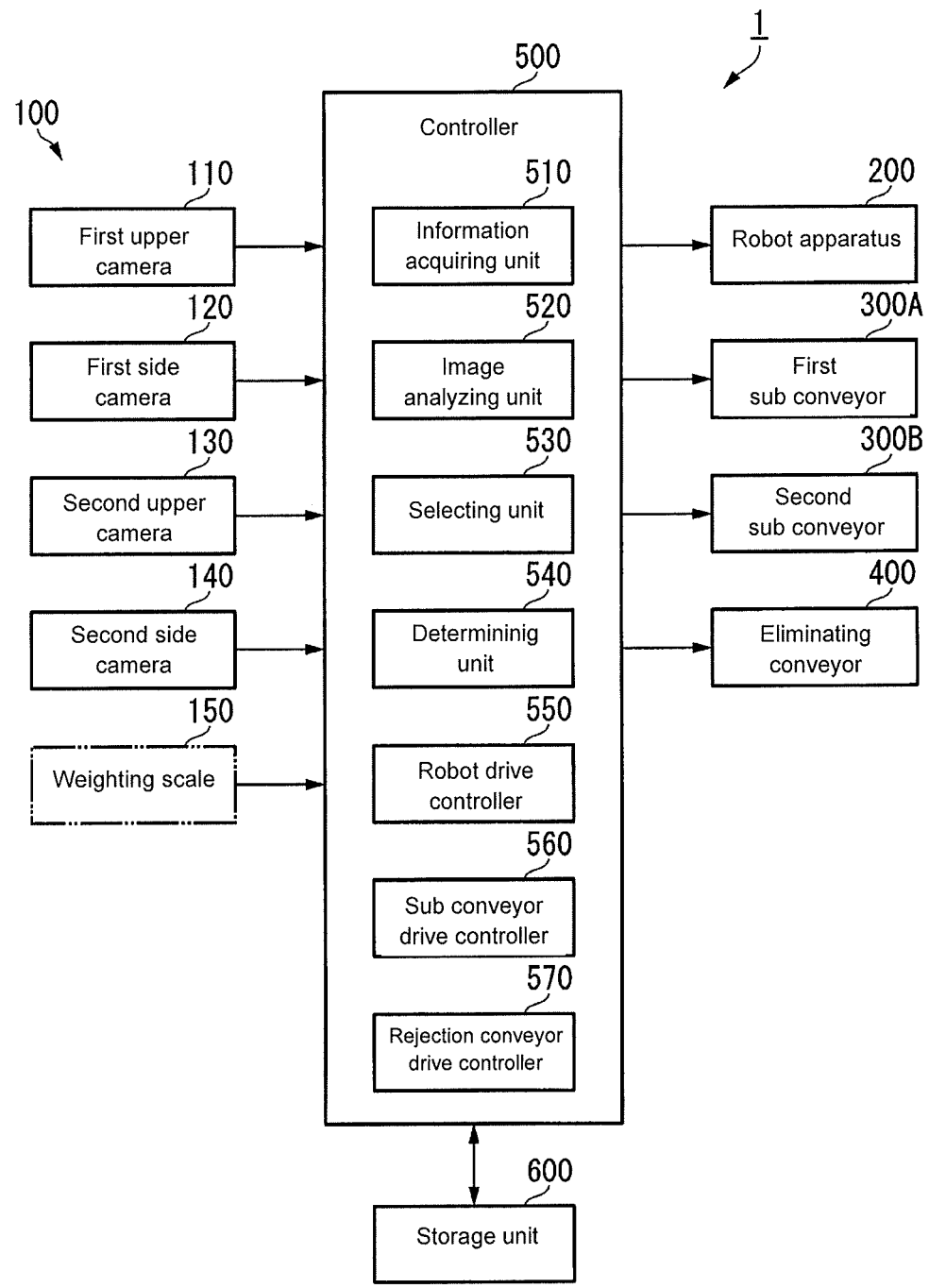
FIG. 2 is a block diagram showing the system configuration of the conveying system of the first embodiment.

As shown in FIG. 1, a conveying system 1 has, for example, a detecting unit 100, a robot apparatus 200, a first sub conveyor 300A, a second sub conveyor 300B, an eliminating conveyor 400, a controller 500 (see FIG. 2), and a storage unit 600 (see FIG. 2). In the description below, when the first sub conveyor 300A and the second sub conveyor 300B are not distinguished from each other, they may be simply referred to as sub conveyors 300.

The detecting unit 100 has, for example, a first upper camera 110 (see FIG. 2), a first side camera 120, a second upper camera 130 (see FIG. 2), and a second side camera 140.

The first upper camera 110 is arranged above the first collected package arrangement area A1. The first upper camera 110 captures, from above, an image of a plurality of packages P in the container C arranged in the first collected package arrangement area A1. That is to say, the first upper camera 110 captures an image of upper faces of a plurality of packages P. Meanwhile, in plan view, the first side camera 120 is located on a side, in the X direction, of the first collected package arrangement area A1, for example. The first side camera 120 captures an image of a side face of a package P retrieved (lifted) by the robot apparatus 200 from the container C arranged in the first collected package arrangement area A1. The term "side face" in this example is used to mean a "face that is different from an upper face and a lower face". The information detected by the first upper camera 110 and the first side camera 120 is sent to the controller 500 and used for determination regarding the predetermined condition. For example, the detecting unit 100 obtains information of the lengths in the X direction and the Y direction of the package P from an image or a video captured by the first upper camera 110, and obtains information of the length in the Z direction of the package P from an image or a video captured by the first side camera 120. Each of the first upper camera 110 and the first side camera 120 is an example of a detecting apparatus configured to detect information related to the size of the package P.

In a similar manner, the second upper camera 130 is arranged above the second collected package arrangement area A2. The second upper camera 130 captures, from above, an image of a plurality of packages P in the container C arranged in the second collected package arrangement area A2. That is to say, the second upper camera 130 captures an image of upper faces of a plurality of packages P. Meanwhile, in plan view, the second side camera 140 is located on a side, in the X direction, of the second collected package arrangement area A2, for example. The second side camera 140 captures an image of a side face of a package P retrieved (lifted) by the robot apparatus 200 from the container C arranged in the second collected package arrangement area A2. The information detected by the second upper camera 130 and the second side camera 140 is sent to the controller 500 and used for determination regarding the predetermined condition. For example, the detecting unit 100 obtains information of the lengths in the X direction and the Y direction of the package P from an image or a video captured by the second upper camera 130, and obtains information of the length in the Z direction of the package P from an image or a video captured by the second side camera 140. Each of the second upper camera 130 and the second side camera 140 is an example of a detecting apparatus configured to detect information related to the size of the package P.

The detecting apparatus configured to detect information related to the size of the package P is not limited to the above-described example. For example, a laser range finder or another type of sensor may be used as appropriate as the detecting apparatus configured to detect information related to the size of the package P.

Furthermore, if the determination regarding the predetermined condition is performed based on the weight of the package P, the detecting unit 100 may have a weighing scale 150 (see FIG. 2) configured to detect the weight of the package P. For example, the weighing scale 150 may be provided in the first collected package arrangement area A1 and the second collected package arrangement area A2, and obtain information related to the weight of the package P by detecting the weight of the container C and packages in the container C that changes when a package P is lifted by the robot apparatus 200. Alternatively, the weighing scale 150 may be provided inside or on the lower side of the robot apparatus 200, and obtains information related to the weight of the package P by detecting the load acting on the robot apparatus 200 when a package P is lifted by the robot apparatus 200. Alternatively, the weighing scale 150 may be provided on the lower side of the first sub conveyor 300A and the second sub conveyor 300B, and, when a package P is placed on the first sub conveyor 300A or the second sub conveyor 300B, obtain information related to the weight of the package P by detecting the weight of the first sub conveyor 300A or the second sub conveyor 300B and the package P that changes when the package P is placed thereon.

The robot apparatus 200 has a holding unit 210 and an arm 220.

Figure 12:
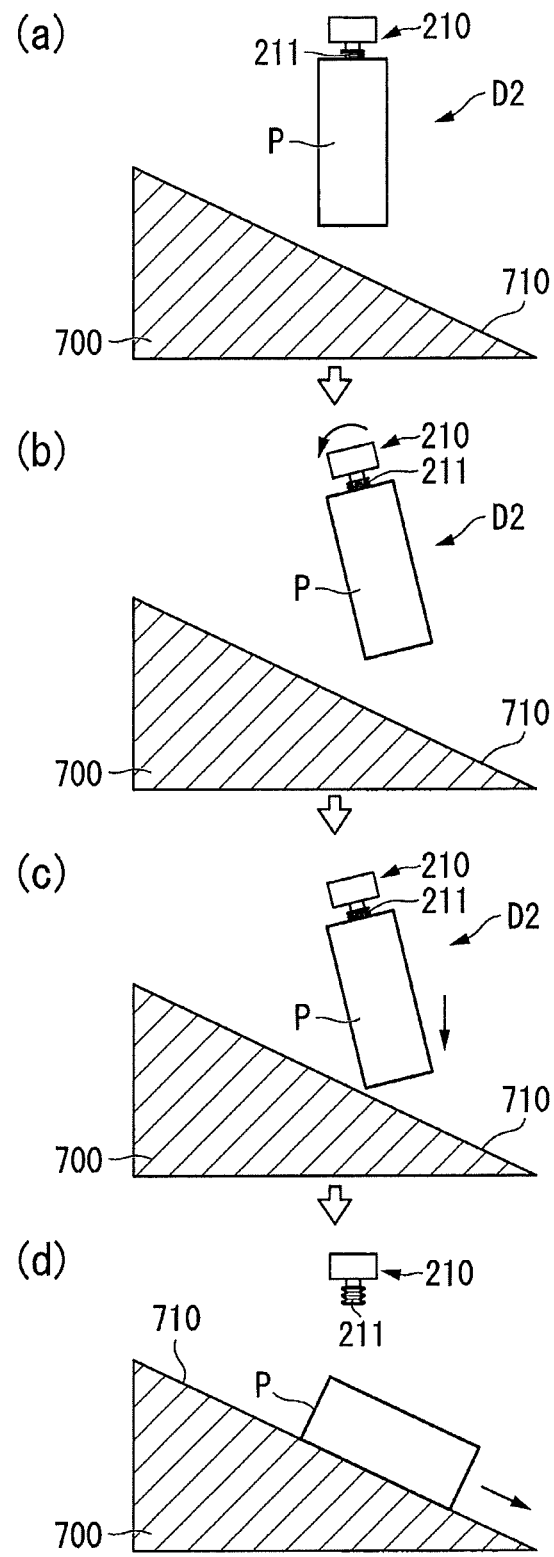
FIG. 12 is a side view illustrating an operation example in which a package is inclined in the fifth embodiment.

The holding unit 210 has, for example, one or more suction pads 211 (see FIG. 12). A pump that vacuum-sucks the suction pads 211 is connected, for example, via a hose or the like to the suction pads 211. The holding unit 210 is configured to hold the package P through suction of the suction pads 211 in a state in which the suction pads 211 are pressed against the package P. The holding unit 210 is not limited to the above-described example, and also may hold the package P using a mechanism configured to hold the package P by sandwiching the package P or another mechanism.

The arm 220 is, for example, an articulated arm, and has a plurality of arm members and a linking unit that links the plurality of arm members in a rotatable manner. The front end of the arm 220 is connected to the holding unit 210, and supports the holding unit 210. The arm 220 can move the holding unit 210 to a desired position in a three-dimensional space based on coordinates in the X direction, the Y direction, and the Z direction input by the controller 500. The arm 220 conveys the package P that is being held by the holding unit 210, by moving the holding unit 210.

The robot apparatus 200 is located next to the main conveyor MC, in the Y direction. The robot apparatus 200 is located substantially at the center, in the X direction, between the first collected package arrangement area A1 and the second collected package arrangement area A2. The robot apparatus 200 can move the holding unit 210 to the internal portion of the container C arranged in the first collected package arrangement area A1, and hold and lift a package P inside the container C. Accordingly, the robot apparatus 200 can unload the packages P collected in the container C arranged in the first collected package arrangement area A1. The robot apparatus 200 places the package P retrieved from the container C arranged in the first collected package arrangement area A1, on the first sub conveyor 300A.

In a similar manner, the robot apparatus 200 can move the holding unit 210 to the internal portion of the container C arranged in the second collected package arrangement area A2, and hold and lift a package P inside the container C. Accordingly, the robot apparatus 200 can unload the packages P collected in the container C arranged in the second collected package arrangement area A2. The robot apparatus 200 places the package P retrieved from the internal portion of the container C arranged in the second collected package arrangement area A2, on the second sub conveyor 300B.

The first sub conveyor 300A is located between the first collected package arrangement area A1 (i.e., the container C arranged in the first collected package arrangement area A1) and the robot apparatus 200, in the X direction. The first sub conveyor 300A is located next to the robot apparatus 200, in the X direction. The first sub conveyor 300A extends in the Y direction. The first sub conveyor 300A has a first end 300Aa that faces, in the +Y direction, the main conveyor MC. The first sub conveyor 300A conveys, in the +Y direction, the package P placed on the first sub conveyor 300A. The first sub conveyor 300A receives, from the robot apparatus 200, the package P retrieved by the robot apparatus 200 from the container C arranged in the first collected package arrangement area A1. The first sub conveyor 300A conveys the package P received from the robot apparatus 200 toward the main conveyor MC. The first sub conveyor 300A sends the package P that is being conveyed toward the main conveyor MC, onto the main conveyor MC.

The second sub conveyor 300B is located between the second collected package arrangement area A2 (i.e., the container C arranged in the second collected package arrangement area A2) and the robot apparatus 200, in the X direction. That is to say, the second sub conveyor 300B is located next to the robot apparatus 200, on the opposite side of the first sub conveyor 300A with respect to the robot apparatus 200. The second sub conveyor 300B extends in the Y direction. The second sub conveyor 300B has a first end 300Ba that faces, in the +Y direction, the main conveyor MC. The second sub conveyor 300B conveys, in the +Y direction, the package P placed on the second sub conveyor 300B. The second sub conveyor 300B receives, from the robot apparatus 200, the package P retrieved by the robot apparatus 200 from the container C arranged in the second collected package arrangement area A2. The second sub conveyor 300B conveys the package P received from the robot apparatus 200 toward the main conveyor MC. The second sub conveyor 300B sends the package P that is being conveyed toward the main conveyor MC, onto the main conveyor MC.

As described above, in this embodiment, the first collected package arrangement area A1, the first sub conveyor 300A, the second collected package arrangement area A2, and the second sub conveyor 300B are arranged symmetric about the robot apparatus 200.

The sub conveyors 300 have a lift structure (not shown) for lifting the main portions of the sub conveyors 300 relative to an installation face on which the sub conveyors 300 are installed. Accordingly, even in a case in which the sub conveyors 300 are located next to the robot apparatus 200, it is easy to access the robot apparatus 200 when the robot apparatus 200 is to undergo maintenance.

The eliminating conveyor 400 is located on the opposite side of the main conveyor MC with respect to the robot apparatus 200. The eliminating conveyor 400 extends in the Y direction. The eliminating conveyor 400 extends toward the package recovery area A3 (i.e., the recovery container RC arranged in the package recovery area A3). The eliminating conveyor 400 conveys the package P placed on the eliminating conveyor 400, toward the recovery container RC. The eliminating conveyor 400 sends the package P that is being conveyed toward the recovery container RC, onto the internal portion of the recovery container RC.

From one point of view, the main conveyor MC, the first sub conveyor 300A, the second sub conveyor 300B, and the eliminating conveyor 400 described above are respectively examples of the "first conveyor", the "second conveyor", the "third conveyor", and the "fourth conveyor". From another point of view, the main conveyor MC, the first sub conveyor 300A, and the eliminating conveyor 400 are respectively examples of the "first conveyor", the "second conveyor", and the "third conveyor". The main conveyor MC, the first sub conveyor 300A, the second sub conveyor 300B, and the eliminating conveyor 400 may be belt conveyors, may be roller conveyors each constituted by a plurality of rotating rollers, or may be another type of conveyor.

FIG. 2 is a block diagram showing the system configuration of the conveying system 1 of this embodiment.

As shown in FIG. 2, the controller 500 is communicably connected to the detecting apparatuses included in the detecting unit 100, the robot apparatus 200, the first sub conveyor 300A, the second sub conveyor 300B, the eliminating conveyor 400, and the storage unit 600. The controller 500 sends instructions related to operations of the robot apparatus 200, the first sub conveyor 300A, the second sub conveyor 300B, and the eliminating conveyor 400, to these apparatuses, thereby controlling operations of these apparatuses.

The controller 500 is a software functional unit realized by a processor (e.g., CPU (Central Processing Unit)) of the conveying system 1 executing programs. Note that part of or the entire controller 500 may be realized by hardware such as an LSI (Large Scale Integration), an ASIC (Application Specific Integrated Circuit), an FPGA (Field-Programmable Gate Array), or may be realized by a software functional unit and hardware operating in cooperation with each other.

The storage unit 600 is realized by, for example, a RAM (Random Access Memory), a ROM (Read Only Memory), an HDD (Hard Disk Drive), a flash memory, or a hybrid storage device obtained by combining two or more of these devices. The storage unit 600 stores thresholds used for various types of determination including the above-described predetermined condition.

Next, the controller 500 of this embodiment will be described in detail.

As shown in FIG. 2, the controller 500 has, for example, an information acquiring unit 510, an image analyzing unit 520, a selecting unit 530, a determining unit 540, a robot drive controller 550, a sub conveyor drive controller 560, and an eliminating conveyor drive controller 570.

The information acquiring unit 510 acquires information detected by the detecting unit 100 (e.g., the first upper camera 110, the first side camera 120, the second upper camera 130, and the second side camera 140), from the detecting unit 100. The information acquiring unit 510 outputs the information acquired from the detecting unit 100, to the image analyzing unit 520.

The image analyzing unit 520 analyzes the information (image or video) acquired by the detecting unit 100. For example, the image analyzing unit 520 analyzes the image or video captured by the first upper camera 110, thereby acquiring the positions and the dimensions of a plurality of packages P accommodated in the container C arranged in the first collected package arrangement area A1. For example, the image analyzing unit 520 acquires the dimensions of the packages P (the width dimensions and the depth dimensions of the packages P) when viewed from above. Furthermore, the image analyzing unit 520 analyzes the image or video captured by the first side camera 120, thereby acquiring the height dimension of a package P that is being lifted from the container C arranged in the first collected package arrangement area A1.

In a similar manner, the image analyzing unit 520 analyzes the image or video captured by the second upper camera 130, thereby acquiring the positions and the dimensions of a plurality of packages P accommodated in the container C arranged in the second collected package arrangement area A2. For example, the image analyzing unit 520 acquires the dimensions of the packages P (the width dimensions and the depth dimensions of the packages P) when viewed from above. Furthermore, the image analyzing unit 520 analyzes the image or video captured by the second side camera 140, thereby acquiring the height dimension of a package P that is being lifted from the container C arranged in the second collected package arrangement area A2. The image analyzing unit 520 outputs the positional information of the packages P acquired through the image analysis, to the selecting unit 530 and the robot drive controller 550. Furthermore, the image analyzing unit 520 outputs the information of the dimensions of the packages P acquired through the image analysis, to the determining unit 540.

The selecting unit 530 selects one or more packages P that are to be preferentially retrieved, from among the packages P in the container C arranged in the first collected package arrangement area A1 (or the container C arranged in the second collected package arrangement area A2), based on the positional information of the packages P acquired by the image analyzing unit 520. For example, the selecting unit 530 selects packages P that are to be preferentially retrieved, while comprehensively considering the stacked state of the plurality of packages P, the position of the robot apparatus 200 relative to the container C, and the like. The term "preferentially" means that a package is to be retrieved prior to others. For example, the selecting unit 530 selects a package P that is positioned at the top of the packages P, a package P that is positioned close to the opening Cd, or the like, as a package P that is to be preferentially retrieved, from among the packages P accommodated in the container C. The selecting unit 530 outputs the information indicating the selected package P (hereinafter, this may be referred to as a "picking package P"), to the robot drive controller 550.

The determining unit 540 determines whether or not the package P retrieved by the robot apparatus 200 satisfies the predetermined condition (first condition), based on the information of the dimensions of the packages P acquired by the image analyzing unit 520. For example, the determining unit 540 compares the largest dimension of the package P and the threshold regarding the size read from the storage unit 600, and determines whether or not the largest dimension of the package P is less than the threshold. If the largest dimension of the package P is less than the threshold, the determining unit 540 determines that the package P satisfies the predetermined condition, and regards the package P as a package that is to be handled. On the other hand, if the largest dimension of the package P is greater than or equal to the threshold, the determining unit 540 determines that the package P does not satisfy the predetermined condition, and regards the package P as a package that is not to be handled.

The determining unit 540 outputs the determination result regarding the predetermined condition, to the robot drive controller 550 and the sub conveyor drive controller 560.

The configurations and the functions of the detecting unit 100 and the determining unit 540 are not limited to the above-described examples. For example, the detecting unit 100 does not necessarily need to have the first side camera 120 and the second side camera 140. In this case, the determining unit 540 may perform the determination regarding the predetermined condition, based on only the information detected by the first upper camera 110 and the second upper camera 130 (i.e., the dimensions of the upper faces of the packages P).

The robot drive controller 550 controls driving of the robot apparatus 200. For example, the robot drive controller 550 calculates a route of the arm 220, based on the positional information of the packages P acquired by the image analyzing unit 520, the information indicating the picking packages P selected by the selecting unit 530, and the like. The robot drive controller 550 controls the robot apparatus 200 so as to retrieve each package P from the container C arranged in the first collected package arrangement area A1 (or the container C arranged in the second collected package arrangement area A2) by making the holding unit 210 hold the package P and moving the arm 220.

Furthermore, the robot drive controller 550 determines a movement destination (placement destination) of the package P retrieved from the container C arranged in the first collected package arrangement area A1 (or the container C arranged in the second collected package arrangement area A2), based on a result of the determination performed by the determining unit 540. For example, if the package P satisfies the predetermined condition (is regarded as a package that is to be handled), the robot drive controller 550 controls the robot apparatus 200 so as to place the package retrieved from the container C, on the sub conveyor 300 (the first sub conveyor 300A or the second sub conveyor 300B) that is closer to that container C. On the other hand, if the package P does not satisfy the predetermined condition (is regarded as a package that is not to be handled), the robot drive controller 550 controls the robot apparatus 200 so as to place the package P retrieved from the container C on the eliminating conveyor 400.

Figure 3:
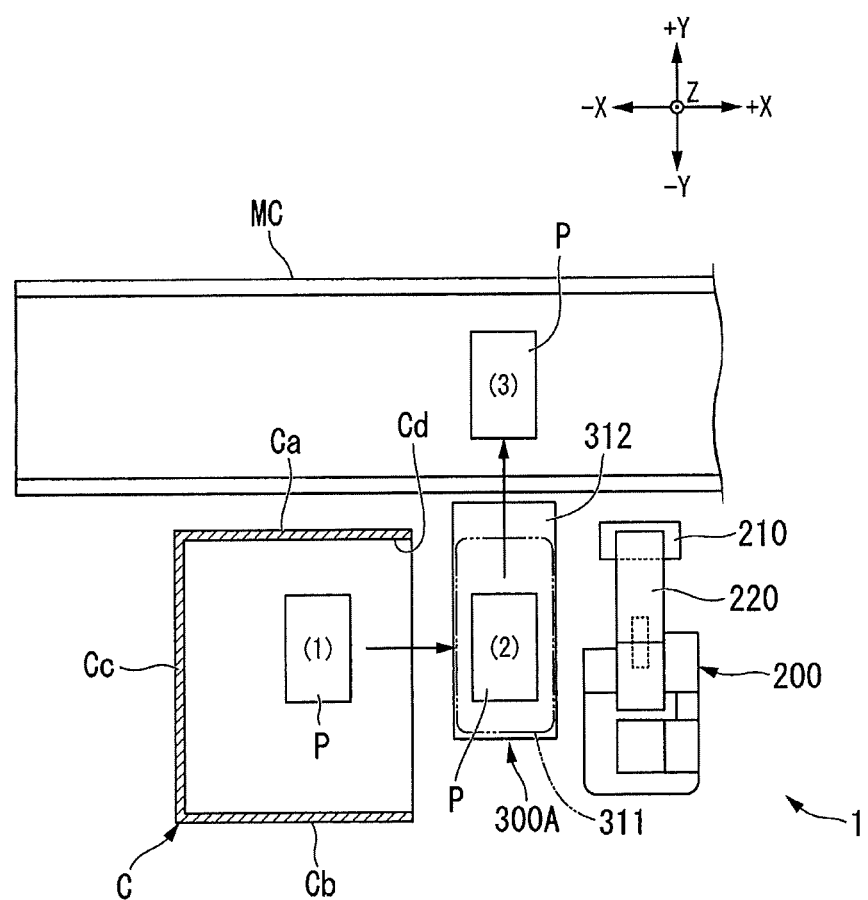
FIG. 3 is a plan view showing an example of a conveying route of a package in the conveying system of the first embodiment.

FIG. 3 is a view showing an example of a conveying route of the package P in the conveying system 1. As shown in FIG. 3, the first sub conveyor 300A has, for example, a first area 311 and a second area 312. The first area 311 is an area that is located on a side, in the X direction, of the opening Cd of the container C. In other words, the first area 311 is an area through which the package P can be moved from the internal portion of the container C without being obstructed by the first side wall Ca and the second side wall Cb of the container C. In this embodiment, the robot drive controller 550 controls the robot apparatus 200 so as to shift the package P from the container C to the first area 311 of the first sub conveyor 300A (so as to move the package P from (1) to (2) in FIG. 3). With this conveying route of the package P, there is no need to calculate the route and the like through which the robot apparatus 200 conveys the package P toward the main conveyor MC while avoiding the first side wall Ca and the second side wall Cb of the container C. Accordingly, it is possible to simplify the control algorithm of the robot apparatus 200. FIG. 3 shows an example related to the first sub conveyor 300A. Note that the same applies to the second sub conveyor 300B.

The sub conveyor drive controller 560 controls driving of the first sub conveyor 300A and the second sub conveyor 300B. For example, when the robot apparatus 200 retrieves the package P from the container C arranged in the first collected package arrangement area A1, the sub conveyor drive controller 560 drives the first sub conveyor 300A. The first sub conveyor 300A may be driven only when the package P is actually placed on the first sub conveyor 300A, or may be continuously driven throughout the time in which the robot apparatus 200 retrieves packages P from the container C arranged in the first collected package arrangement area A1. For example, the sub conveyor drive controller 560 drives the first sub conveyor 300A so as to convey the package P placed by the robot apparatus 200 on the first area 311 of the first sub conveyor 300A, toward the main conveyor MC (so as to move the package P from (2) to (3) in FIG. 3).

In a similar manner, when the robot apparatus 200 retrieves the package P from the container C arranged in the second collected package arrangement area A2, the sub conveyor drive controller 560 drives the second sub conveyor 300B. The second sub conveyor 300B may be driven only when the package P is actually placed on the second sub conveyor 300B, or may be continuously driven throughout the time in which the robot apparatus 200 retrieves packages P from the container C arranged in the second collected package arrangement area A2. For example, the sub conveyor drive controller 560 controls the second sub conveyor 300B so as to convey the package P placed by the robot apparatus 200 on the first area 311 of the second sub conveyor 300B, toward the main conveyor MC.

The eliminating conveyor drive controller 570 controls driving of the eliminating conveyor 400. For example, the eliminating conveyor drive controller 570 is driven when the package P is placed on the eliminating conveyor 400.

Next, an example of the operation flow of the conveying system 1 of this embodiment will be described.

Figure 4:
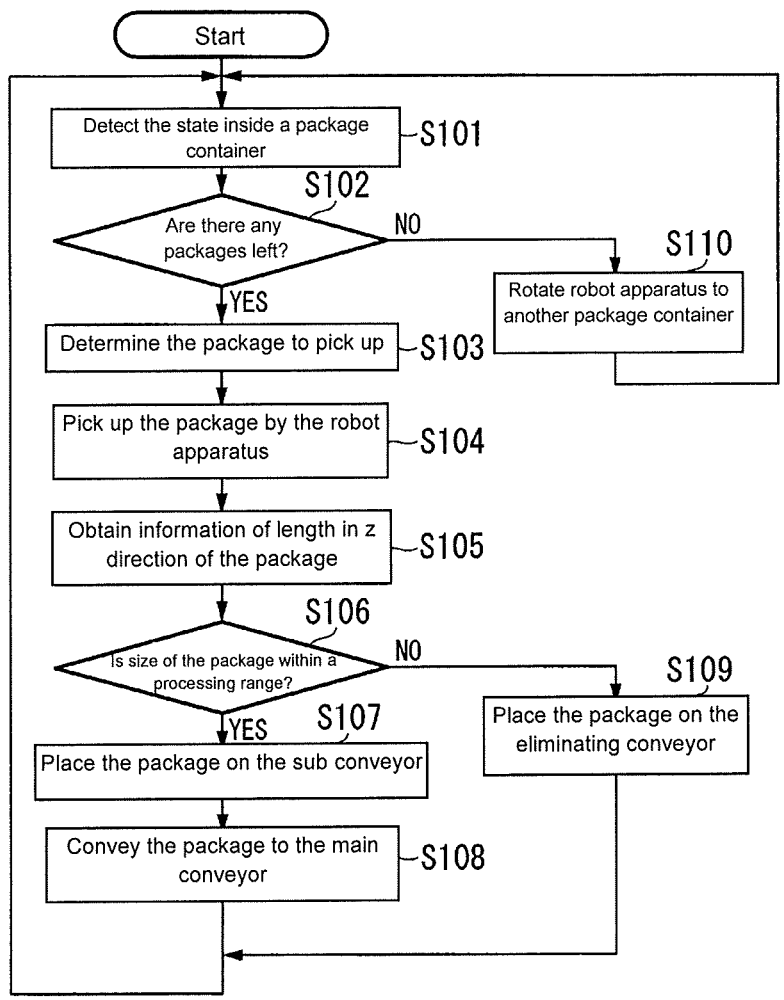
FIG. 4 is a flowchart showing an example of the operation flow of the conveying system of the first embodiment.

FIG. 4 is a flowchart showing an example of the operation flow of the conveying system 1 of this embodiment. As shown in FIG. 4, first, the detecting unit 100 detects the state inside a container C (S101). In this embodiment, the detecting unit 100 captures an image or a video of the internal portion of the container C. The detecting unit 100 sends the captured image or video to the controller 500. The image analyzing unit 520 of the controller 500 analyzes the image or video received from the detecting unit 100, thereby acquiring positional information and the dimensional information of the package P.

Next, the selecting unit 530 of the controller 500 determines whether or not there is any packages P left in the container C, based on a result of the analysis performed by the image analyzing unit 520 (S102). If it is determined that there is a package P left in the container C, the selecting unit 530 determines one or more packages P (picking packages P) that are to be preferentially retrieved, from among the packages P in the container C (S103). The selecting unit 530 sends the information indicating the picking packages P determined by the selecting unit 530, to the robot drive controller 550. The robot drive controller 550 controls driving of the robot apparatus 200 based on the information related to the picking packages P determined by the selecting unit 530, the positional information of the packages P acquired by the image analyzing unit 520, and the like, and retrieves each picking package P from the container C (S104). The detecting unit 100 obtains information of the length in the Z direction of the package P from the image or video captured by the first side camera 120 (or the second side camera 140) (S105).

Next, the determining unit 540 determines whether or not the package P retrieved by the robot apparatus 200 satisfies the predetermined condition (S106). If the determining unit 540 determines that the package P retrieved by the robot apparatus 200 satisfies the predetermined condition, the robot drive controller 550 controls the robot apparatus 200 so as to place the retrieved package P, on the sub conveyor 300 that is closer to the container C from which the package P was retrieved (S107). The sub conveyor 300 on which the package P was placed by the robot apparatus 200 conveys the package P toward the main conveyor MC, and sends the package P onto the main conveyor MC (S108).

On the other hand, if the determining unit 540 determines that the package P retrieved by the robot apparatus 200 does not satisfy the predetermined condition, the robot drive controller 550 controls the robot apparatus 200 so as to place the retrieved package P on the eliminating conveyor 400 (S109). The eliminating conveyor 400 on which the package P has been placed by the robot apparatus 200 conveys the package P toward the recovery container RC, and sends the package P into the recovery container RC.

Furthermore, if it is determined in 5102 that there are packages P left in the container C, the selecting unit 530 outputs information indicating that there are no packages P left, to the robot drive controller 550 and the sub conveyor drive controller 560. In this case, the robot drive controller 550 rotates the robot apparatus 200 to the other container C, of the container C arranged in the first collected package arrangement area A1 and the container C arranged in the second collected package arrangement area A2 (S110). Then, the controller 500 performs the processing in S101 to S109 on the container C accommodating packages P. During this processing, the container C that has been emptied in the previous processing is replaced with a new container C accommodating packages P. The above-described processing is repeated alternately on the container C arranged in the first collected package arrangement area A1 and the container C arranged in the second collected package arrangement area A2. Accordingly, it is possible to process packages P without stopping the picking operation of the robot apparatus 200, and thus it is possible to achieve a higher conveying speed.

According to the conveying system 1 with the above-described configuration, it is possible to achieve higher conveying speed. That is to say, the conveying system 1 of this embodiment has the robot apparatus 200, and the first sub conveyor 300A that is located next to the robot apparatus 200 and is configured to convey the package P received from the robot apparatus 200, toward the main conveyor MC. With this configuration, compared with a case in which the packages P accommodated in the container C are directly conveyed by the robot apparatus 200 to the main conveyor MC, it is possible to shorten the movement distance of the robot apparatus 200. Accordingly, it is possible to shorten the time required for a single operation to retrieve a package P from the container C, and thus it is possible to achieve higher conveying speed.

As a comparative example, a case will be described in which a conveying system having no sub conveyor 300 is additionally installed on an existing main conveyor MC. Various positions and heights of the main conveyor MC are conceivable according to the installation environment of the conveying system 1. Thus, according to the conveying system of this comparative example, there is a need to individually set the coordinates of movement destinations, the routes, and the like of the arm 220 of the robot apparatus 200 according to the position and the height of the main conveyor MC.

On the other hand, the conveying system 1 of this embodiment has the first sub conveyor 300A. In this case, by designing the length and the inclination of the first sub conveyor 300A in conformity with the position and the height of the main conveyor MC, there is no need to give consideration to the position and the height of the main conveyor MC in the control of the robot apparatus 200. Accordingly, it is possible to reduce the amount of work involved when installing the conveying system 1. Furthermore, with the configuration of this embodiment, there is no need to modify the main conveyor MC. Also from this point of view, it is possible to reduce the amount of work involved when installing the conveying system 1. Moreover, since the first sub conveyor 300A is arranged in a space between the container C and the robot apparatus 200, the space occupied by the conveying system 1 can be prevented from being excessively large.

In this embodiment, the conveying system 1 includes the second sub conveyor 300B that is located on the opposite side of the first sub conveyor 300A with respect to the robot apparatus 200, and is configured to convey a package P received from the robot apparatus 200, toward the main conveyor MC. With this configuration, when the container C arranged in the first collected package arrangement area A1 is empty, the packages P can be retrieved by the robot apparatus 200 from the container C arranged in the second collected package arrangement area A2, during which time the container C arranged in the first collected package arrangement area A1 can be replaced with a container C accommodating packages P. The same applies to the case in which the container C arranged in the second collected package arrangement area A2 is empty. Accordingly, even when one of the containers C is empty, the robot apparatus 200 can be continuously operated without being stopped. Accordingly, it is possible to improve the efficiency of the conveying processing.

In this embodiment, the eliminating conveyor 400 is arranged behind the robot apparatus 200. That is to say, the eliminating conveyor 400 is located on the opposite side of the main conveyor belt MC with respect to the robot apparatus 200. With this configuration, even during unloading from either the first collected package arrangement area A1 or the second collected package arrangement area A2, it is possible to place a package that is not to be handled on the eliminating conveyor 400. Also, from this point of view, the robot apparatus 200 can be continuously operated without being stopped, and thus it is possible to improve the efficiency of the conveying processing.

In the first embodiment, an example was described in which, if a package P does not satisfy the predetermined condition (first condition), the package P is conveyed by the robot apparatus 200 to the eliminating conveyor 400. Alternatively, for example, if the eliminating conveyor 400 is not provided, the package P may be directly conveyed by the robot apparatus 200 to the package recovery area A3 (e.g., the recovery container RC arranged in the package recovery area A3).

Second Embodiment

Next, a second embodiment will be described. This embodiment is different from the first embodiment in that, if a package P does not satisfy the predetermined condition (first condition), the package P is conveyed to the eliminating conveyor 400 by the first sub conveyor 300A and the second sub conveyor 300B rotating in reverse. The aspects of the configuration other than those described below are as in the first embodiment.

Figure 5:
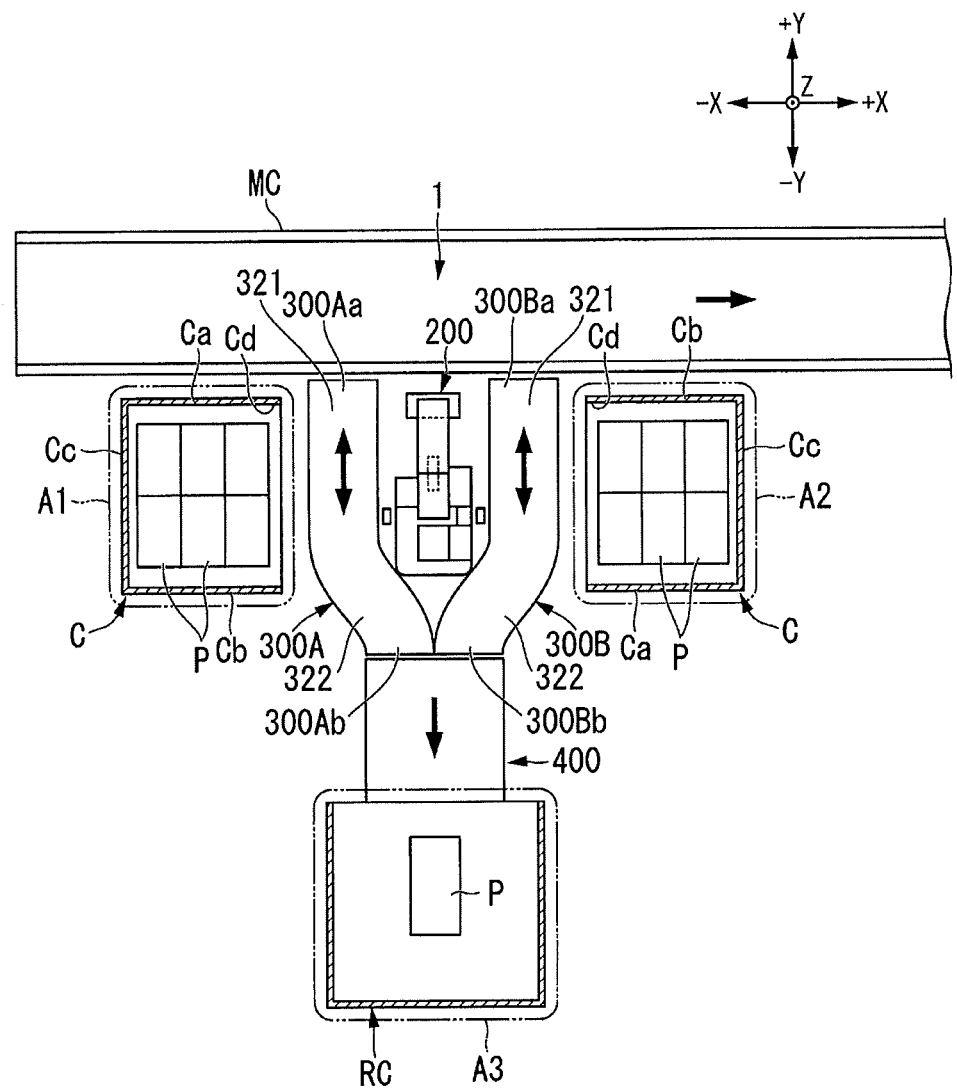
FIG. 5 is a plan view showing a conveying system of a second embodiment.

FIG. 5 is a plan view showing the conveying system 1 of this embodiment. As shown in FIG. 5, in this embodiment, the first sub conveyor 300A has the first end 300Aa and a second end 300Ab. The first end 300Aa faces, in the +Y direction, the main conveyor MC. The second end 300Ab is located on the opposite side of the first end 300Aa, and faces, in the −Y direction, the eliminating conveyor 400. In other words, the eliminating conveyor 400 is located on the opposite side of the main conveyor MC with respect to the first sub conveyor 300A, and is located next to the first sub conveyor 300A. From another point of view, the first sub conveyor 300A has a first portion 321 extending in the shape of a straight line along the Y direction, and a second portion 322 curved from the first portion 321 and extending to the eliminating conveyor 400. The second portion 322 has a plurality of rollers (not shown) arranged at an angle relative to the Y direction, and conveys the package P placed on the first sub conveyor 300A, toward the eliminating conveyor 400.

In a similar manner, the second sub conveyor 300B has the first end 300Ba and a second end 300Bb. The first end 300Ba faces, in the +Y direction, the main conveyor MC. The second end 300Bb is located on the opposite side of the first end 300Ba and faces, in the −Y direction, the eliminating conveyor 400. In other words, the eliminating conveyor 400 is located on the opposite side of the main conveyor MC with respect to the second sub conveyor 300B, and is located next to the second sub conveyor 300B. From another point of view, the second sub conveyor 300B has a first portion 321 extending in the shape of a straight line along the Y direction, and a second portion 322 curved from the first portion 321 and extending to the eliminating conveyor 400. The second portion 322 has a plurality of rollers (not shown) arranged at an angle relative to the Y direction, and conveys the package P placed on the second sub conveyor 300B, toward the eliminating conveyor 400.

In this embodiment, the robot apparatus 200 places the package P retrieved from the container C arranged in the first collected package arrangement area A1, on the first sub conveyor 300A, regardless of whether or not the predetermined condition is satisfied. In a similar manner, the robot apparatus 200 places the package P retrieved from the container C arranged in the second collected package arrangement area A2, on the second sub conveyor 300B, regardless of whether or not the predetermined condition is satisfied.

In this embodiment, the determining unit 540 outputs the determination result regarding the predetermined condition, to the sub conveyor drive controller 560. If the package P retrieved from the container C arranged in the first collected package arrangement area A1 satisfies the predetermined condition (is treated as a package that is to be conveyed), the sub conveyor drive controller 560 rotates the first sub conveyor 300A forward, so that the package P placed by the robot apparatus 200 on the first sub conveyor 300A is conveyed toward the main conveyor MC and is sent onto the main conveyor MC. On the other hand, if the package P retrieved from the container C arranged in the first collected package arrangement area A1 does not satisfy the predetermined condition (is treated as a package that is not to be conveyed), the sub conveyor drive controller 560 rotates the first sub conveyor 300A in reverse, so that the package P placed by the robot apparatus 200 on the first sub conveyor 300A is conveyed toward the eliminating conveyor 400 and is sent onto the eliminating conveyor 400.

In a similar manner, if the package P retrieved from the container C arranged in the second collected package arrangement area A2 satisfies the predetermined condition (is treated as a package that is to be conveyed), the sub conveyor drive controller 560 rotates the second sub conveyor 300B forward, so that the package P placed by the robot apparatus 200 on the second sub conveyor 300B is conveyed toward the main conveyor MC and is sent onto the main conveyor MC. On the other hand, if the package P retrieved from the container C arranged in the second collected package arrangement area A2 does not satisfy the predetermined condition (is treated as a package that is not to be conveyed), the sub conveyor drive controller 560 rotates the second sub conveyor 300B in reverse, so that the package P placed by the robot apparatus 200 on the second sub conveyor 300B is conveyed toward the eliminating conveyor 400 and is sent onto the eliminating conveyor 400.

Next, an example of the operation flow of the conveying system 1 of this embodiment will be described.

Figure 6:
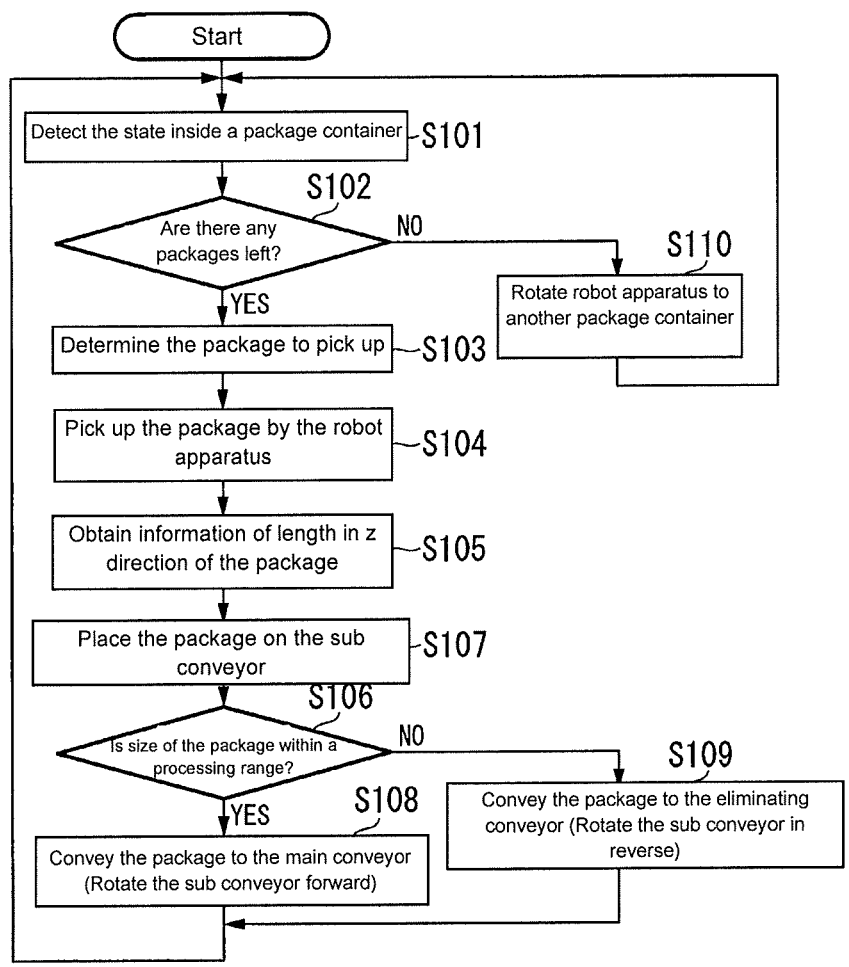
FIG. 6 is a flowchart showing an example of the operation flow of the conveying system of the second embodiment.

FIG. 6 is a flowchart showing an example of the operation flow of the conveying system 1 of this embodiment. In FIG. 6, the processing in S101 to S107 and S110 is similar to the corresponding processing in the first embodiment. In FIG. 6, for facilitating understanding, the processing in S107 is shown before the processing in S106. Note that either one of the processing in S106 and the processing in S107 may be performed prior to the other, or they may be performed in parallel. Furthermore, the processing in S107 may be performed prior to the processing in S105, or may be performed in parallel with the processing in S105.

In this embodiment, if the determining unit 540 determines that a package P satisfies the predetermined condition, the controller 500 rotates the sub conveyor 300 forward, so that the package P placed on the sub conveyor 300 is conveyed to the main conveyor MC (S108). On the other hand, if the determining unit 540 determines that the package P does not satisfy the predetermined condition, the controller 500 rotates the sub conveyor 300 in reverse, so that the package P placed on the sub conveyor 300 is conveyed to the eliminating conveyor 400 (S109).

With the above-described configuration, as in the first embodiment, it is possible to achieve higher conveying speed. The time required for a single operation of the robot apparatus 200 to retrieve a package P from the container C may be longer than the time required for the sub conveyor 300 to convey the package P to the main conveyor MC or the eliminating conveyor 400. Thus, in this embodiment, if a package P does not satisfy the predetermined condition, the controller 500 rotates the first sub conveyor 300A in reverse, so that the operation to convey the package P received from the robot apparatus 200, to the eliminating conveyor 400, is performed by the first sub conveyor 300A. With this configuration, it is possible to shorten the movement distance of the robot apparatus 200. Accordingly, it is possible to achieve even higher conveying speed.

In the second embodiment, an example was described in which, if a package P does not satisfy the predetermined condition (first condition), the package P is conveyed by the sub conveyor 300 to the eliminating conveyor 400. Alternatively, for example, if the eliminating conveyor 400 is not provided, the package P may be directly conveyed by the sub conveyor 300 to the package recovery area A3 (e.g., the recovery container RC arranged in the package recovery area A3).

Third Embodiment

Next, a third embodiment will be described. This embodiment is different from the first embodiment in that the packages P flow on the main conveyor MC from the upstream side of the conveying system 1. The aspects of the configuration other than those described below are as in the first embodiment.

Figure 7:
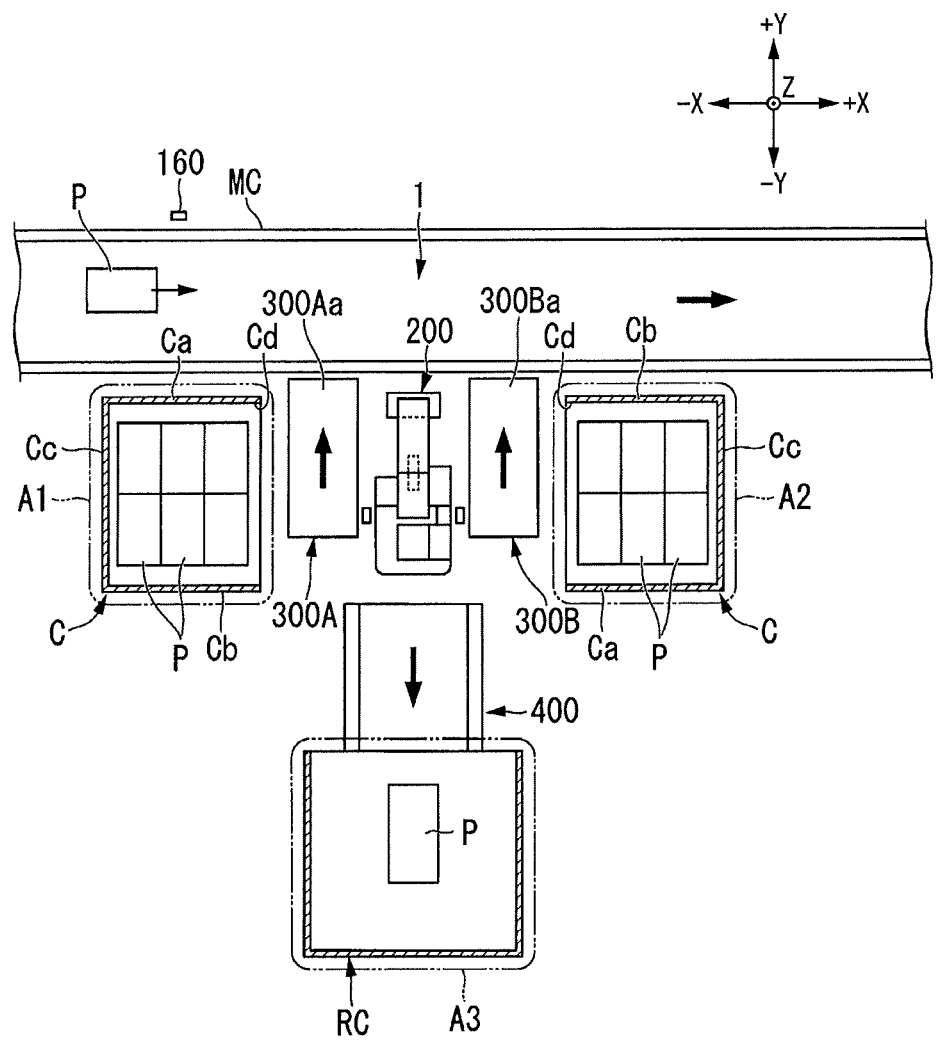
FIG. 7 is a plan view showing a conveying system of a third embodiment.

FIG. 7 is a plan view showing the conveying system 1 of this embodiment.

As shown in FIG. 7, in this embodiment, the detecting unit 100 has a package sensor 160. The package sensor 160 is located next to the main conveyor MC, and is configured to detect the flow of the packages P on the main conveyor MC. For example, if there is a package P within a predetermined distance from the sub conveyor 300, the package sensor 160 detects the package P. A result of the detection performed by the package sensor 160 is output to the controller 500.

In this embodiment, for example, if it is detected that there is a package P on the main conveyor MC within a predetermined distance from the first sub conveyor 300A, the sub conveyor drive controller 560 stops the driving of the first sub conveyor 300A, thereby preventing a package P placed on the first sub conveyor 300A from being sent onto the main conveyor MC. Furthermore, if it is determined, based on the detection result of the package sensor 160, the conveying speed (rotational speed) of the main conveyor MC, and the like that the package P on the main conveyor MC has passed by the first sub conveyor 300A, the sub conveyor drive controller 560 resumes the driving of the first sub conveyor 300A, thereby allowing the package P placed on the first sub conveyor 300A to be sent onto the main conveyor MC. For example, even when the first sub conveyor 300A has been stopped, the robot drive controller 550 may perform an operation to retrieve packages P from the container C arranged in the first collected package arrangement area A1.

In a similar manner, for example, if it is detected that there is a package P on the main conveyor MC within a predetermined distance from the second sub conveyor 300B, the sub conveyor drive controller 560 stops the driving of the second sub conveyor 300B, thereby preventing a package P placed on the second sub conveyor 300B from being sent onto the main conveyor MC. Furthermore, if it is determined based on the detection result of the package sensor 160, the conveying speed (rotational speed) of the main conveyor MC, and the like, that the package P on the main conveyor MC has passed by the second sub conveyor 300B, the sub conveyor drive controller 560 resumes the driving of the second sub conveyor 300B, thereby allowing the package P placed on the second sub conveyor 300B to be sent onto the main conveyor MC. For example, even when the second sub conveyor 300B has been stopped, the robot drive controller 550 may perform the operation to retrieve packages P from the container C arranged in the second collected package arrangement area A2.

With the above-described configuration, as in the first embodiment, it is possible to achieve higher conveying speed. Furthermore, according to this embodiment, the sub conveyors 300 function as a buffer, and thus even when there is a package P that is an obstruction on the main conveyor MC, operation of the robot apparatus 200 can be continued. Accordingly, it is possible to shorten or eliminate the time in which the robot apparatus 200 is stopped, and thus it is possible to achieve even higher conveying speed.

Fourth Embodiment

Next, a fourth embodiment will be described. This embodiment is different from the second embodiment in that the conveying system 1 is a loading apparatus for loading the packages P supplied from the main conveyor MC, into a container C. The aspects of the configuration other than those described below are as in the second embodiment.

Figure 8:
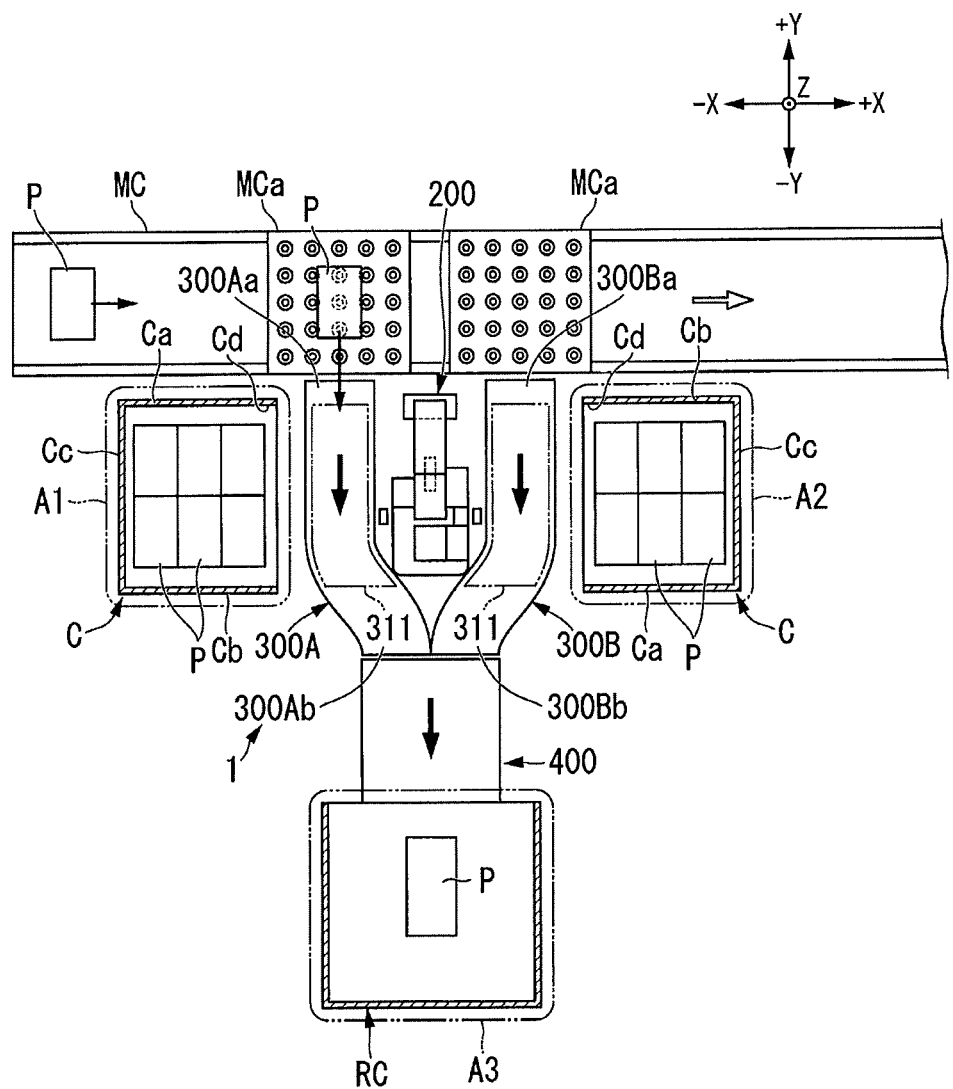
FIG. 8 is a plan view showing a conveying system of a fourth embodiment.

FIG. 8 is a plan view showing the conveying system 1 of this embodiment.

As shown in FIG. 8, in this embodiment, the main conveyor MC is a supply conveyor for supplying, to the conveying system 1, the packages P that are to be loaded into the containers C arranged in the first collected package arrangement area A1 and the second collected package arrangement area A2. The main conveyor MC has supply units MCa for supplying the packages P that flow on the main conveyor MC, to the sub conveyor 300 (the first sub conveyor 300A or the second sub conveyor 300B). The supply units MCa are direction change units for changing the flow direction of the packages P flowing in the +X direction, and sends the packages P onto the sub conveyor 300. The supply units MCa are, for example, diverting conveyors, turn rollers, or the like, but are not limited to these examples. Furthermore, in this embodiment, empty containers C to which the packages P are to be loaded by the conveying system 1 are arranged in the first collected package arrangement area A1 and the second collected package arrangement area A2.

In this embodiment, the first upper camera 110 is arranged above the first sub conveyor 300A, and captures an image of the packages P placed on the first sub conveyor 300A. In a similar manner, the second upper camera 130 is arranged above the second sub conveyor 300B, and captures an image of the packages P placed on the second sub conveyor 300B. Furthermore, in this embodiment, the first side camera 120 captures an image of side faces of the packages P placed on the first sub conveyor 300A. In a similar manner, the second side camera 140 captures an image of side faces of the packages P placed on the second sub conveyor 300B. The image analyzing unit 520 analyzes the images or the videos captured by the first upper camera 110 and the first side camera 120, thereby acquiring the positional information and the dimensional information of the packages P that are being conveyed by the first sub conveyor 300A. In a similar manner, the image analyzing unit 520 analyzes the images or the videos captured by the second upper camera 130 and the second side camera 140, thereby acquiring the positional information and the dimensional information of the packages P that are being conveyed by the second sub conveyor 300B.

As described above, the first sub conveyor 300A receives the packages P from the supply unit MCa of the main conveyor MC. The first sub conveyor 300A conveys, in the −Y direction, the packages P received from the supply unit MCa. The first sub conveyor 300A conveys the packages P received from the supply unit MCa, to a position that is closer to the robot apparatus 200 than the main conveyor MC is. For example, the first sub conveyor 300A conveys the packages P received from the supply unit MCa, to a position that is located on a side, in the X direction, of the robot apparatus 200. For example, the first sub conveyor 300A conveys the packages P received from the supply unit MCa, to a position at which all the packages P are included in the first area 311 of the first sub conveyor 300A.

In a similar manner, the second sub conveyor 300B receives the packages P from the supply unit MCa of the main conveyor MC. The second sub conveyor 300B conveys, in the −Y direction, the packages P received from the supply unit MCa. The second sub conveyor 300B conveys the packages P received from the supply unit MCa, to a position that is closer to the robot apparatus 200 than the main conveyor MC is. For example, the second sub conveyor 300B conveys the packages P received from the supply unit MCa, to a position that is located on a side, in the X direction, of the robot apparatus 200. For example, the second sub conveyor 300B conveys the packages P received from the supply unit MCa, to a position at which all the packages P are included in the first area 311 of the second sub conveyor 300B.

If a package P conveyed by the first sub conveyor 300A satisfies the predetermined condition (first condition), the robot drive controller 550 controls the robot apparatus 200 such that the package P is held by the holding unit 210 and is conveyed into the container C arranged in the first collected package arrangement area A1. Accordingly, the robot apparatus 200 loads the package P to the container C arranged in the first collected package arrangement area A1. On the other hand, if a package P on the first sub conveyor 300A does not satisfy the predetermined condition, the robot drive controller 550 controls the robot apparatus 200 so as not to retrieve the package P. Accordingly, the package P on the first sub conveyor 300A is conveyed by the first sub conveyor 300A toward the eliminating conveyor 400, and is sent onto the eliminating conveyor 400.

In a similar manner, if a package P conveyed by the second sub conveyor 300B satisfies the predetermined condition, the robot drive controller 550 controls the robot apparatus 200 such that the package P is held by the holding unit 210 and is conveyed into the container C arranged in the second collected package arrangement area A2. Accordingly, the robot apparatus 200 loads the package P to the container C arranged in the second collected package arrangement area A2. On the other hand, if a package P on the second sub conveyor 300B does not satisfy the predetermined condition, the robot drive controller 550 controls the robot apparatus 200 so as not to retrieve the package P. Accordingly, the package P on the second sub conveyor 300B is conveyed by the second sub conveyor 300B toward the eliminating conveyor 400, and is sent onto the eliminating conveyor 400.

With the above-described configuration, as in the first embodiment, it is possible to shorten the movement distance of the robot apparatus 200, and thus it is possible to achieve higher conveying speed.

Fifth Embodiment

Next, a fifth embodiment will be described. This embodiment is different from the first embodiment in that an inclined table 700 for changing the orientation of a package P from a vertically long orientation to a horizontally long orientation and supplying the package P to the main conveyor MC. The aspects of the configuration other than those described below are as in the first embodiment.

Figure 9:
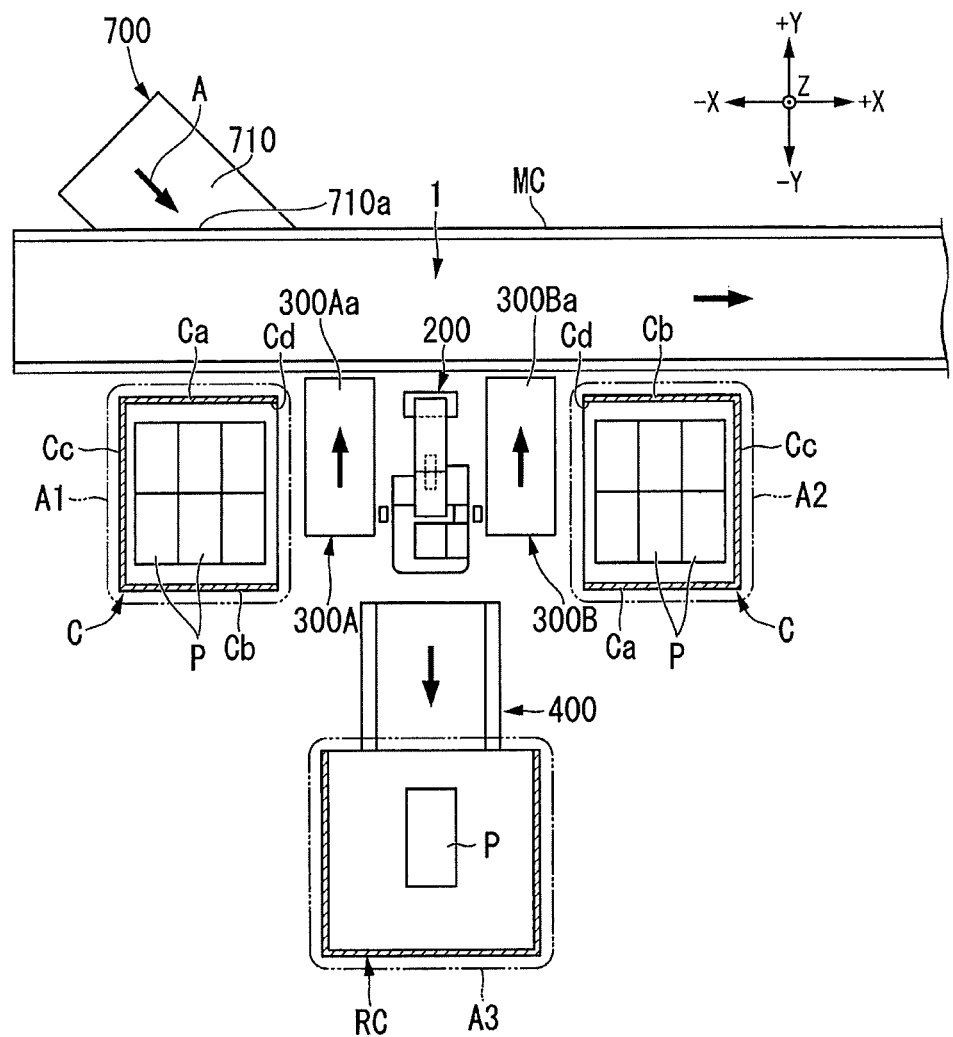
FIG. 9 is a plan view showing a conveying system of a fifth embodiment.

FIG. 9 is a plan view showing the conveying system 1 of this embodiment.

As shown in FIG. 9, in this embodiment, the conveying system 1 has the inclined table 700. The inclined table 700 is located next to the main conveyor MC, and is configured such that packages P that are to be supplied to the main conveyor MC are placed on the inclined table 700. For example, the inclined table 700 is located on the opposite side of the robot apparatus 200 with respect to the main conveyor MC. Note that the arrangement position of the inclined table 700 is not limited to the above-described example, and may be on the same side as that of the robot apparatus 200 with respect to the main conveyor MC.

The inclined table 700 has a package receiving unit (upper face portion) 710 that is inclined such that the height thereof decreases toward the main conveyor MC. For example, the height of a package receiving unit 710 decreases following the direction indicated by the arrow A in FIG. 9. An end 710a located downstream of the package receiving unit 710 is arranged at a position that is substantially at the same height as the upper face (conveying face) of the main conveyor MC or that is slightly higher than the upper face of the main conveyor MC. In this embodiment, the package receiving unit 710 of the inclined table 700 is constituted by a plate-like member made of a material such as metal or resin, and has a smooth surface. Note that the configuration and the material of the inclined table 700 are not limited to those in the example of this embodiment. Modifications of the inclined table 700 will be described later.

Hereinafter, an example of the orientation of a package P retrieved from the container C will be described.

Figure 10A:
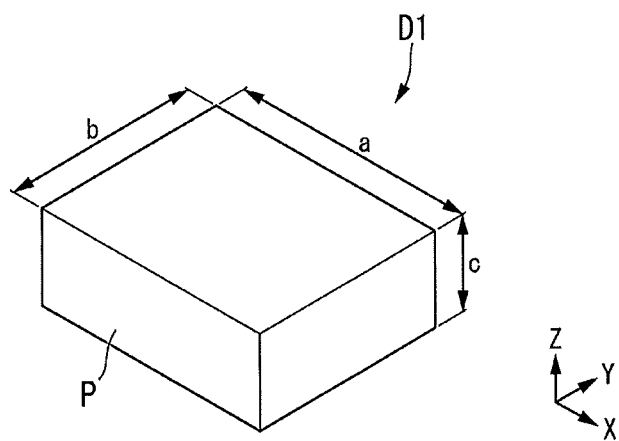
FIG. 10A is a perspective view showing an example of the orientation of a package that is retrieved from a container in the fifth embodiment.
Figure 10B:
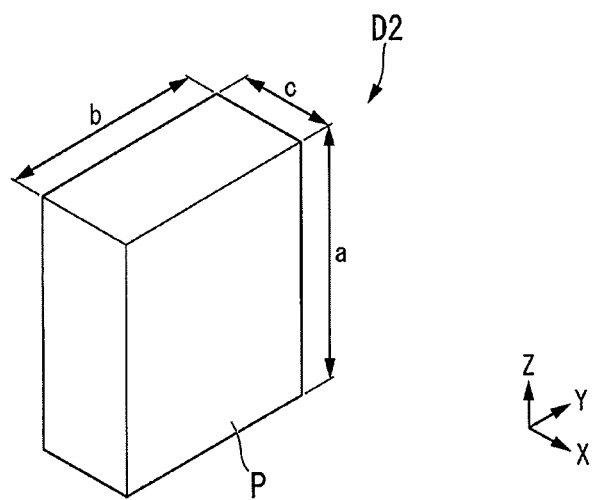
FIG. 10B is a perspective view showing an example of the orientation of a package that is retrieved from a container in the fifth embodiment.

FIGS. 10A and 10B are views showing an example of the orientation of a package P retrieved from the container C. FIG. 10A shows the package P in a horizontally long orientation D1. The horizontally long orientation D1 means an orientation in which a dimension c that is the smallest among the three dimensions a, b, and c defining the width, the depth, and the height of the package P substantially extends along the vertical direction. Meanwhile, FIG. 10B shows the package P in a vertically long orientation D2. The vertically long orientation D2 means an orientation in which a dimension c that is the smallest among the three dimensions a, b, and c defining the width, the depth, and the height of the package P not substantially extending along the vertical direction. Note that the definitions of the horizontally long orientation D1 and the vertically long orientation D2 are not limited to those in the above-described example. It is also possible that the horizontally long orientation D1 is an orientation, for example, in which a dimension b that is the second smallest among the three dimensions a, b, and c substantially extends along the vertical direction. In this case, the vertically long orientation D2 is an orientation in which the dimension a that is the largest among the three dimensions a, b, and c substantially extends along the vertical direction.

Generally, the orientation of the package P in the horizontally long orientation D1 is stable. On the other hand, the orientation of the package P in the vertically long orientation D2 is not stable, and the package P may fall over when being conveyed by a conveyor. In a comparative example, there is a conveying apparatus that, when the package P in the vertically long orientation D2 is retrieved from a container, makes a robot apparatus re-grip the package, thereby changing the orientation of the package P to the horizontally long orientation D1. However, this configuration may reduce the speed of the conveying processing.

Figure 11:
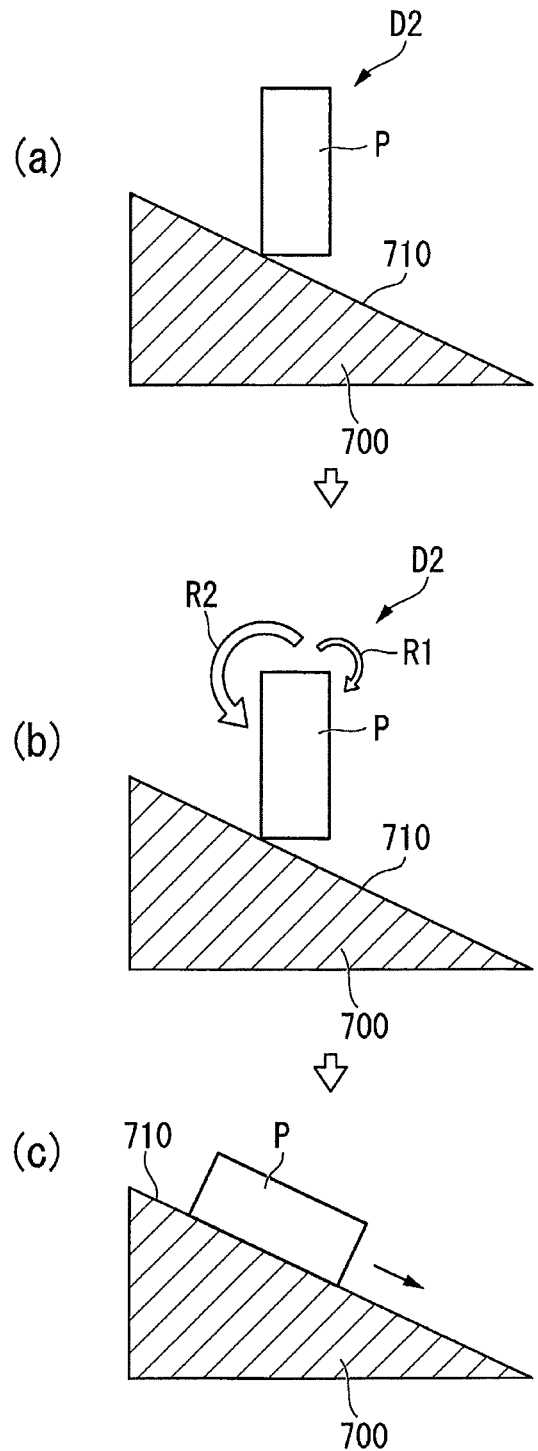
FIG. 11 is a side view illustrating an action of an inclined table of the fifth embodiment.

Thus, in this embodiment, the inclined table 700 described above is used, so that the orientation of the package P changes from the vertically long orientation D2 to the horizontally long orientation D1. Specifically, FIG. 11 is a view illustrating an action of the inclined table 700. As shown in (a) of FIG. 11, when a package P in the vertically long orientation D2 is placed on the package receiving unit 710 of the inclined table 700 inclined at an angle that is at a certain level or greater, the speed at which the bottom face of the package P slides downward over the package receiving unit 710 reaches a certain level or higher. When the speed at which the bottom face of the package P slides downward over the package receiving unit 710 reaches a certain level or higher, as shown in (b), the force of the package P rotating backward (in the direction indicated by the arrow R2 in FIG. 11) becomes greater than the force of the package P rotating forward (in the direction indicated by the arrow R1 in FIG. 11), and the package P rotates backward. As a result, the package P in the vertically long orientation D2 rotates backward so as to extend along the package receiving unit 710, and the package P whose orientation has been changed to the horizontally long orientation D1 as shown in (c) slides downward over the package receiving unit 710. The package P whose orientation has been changed to the horizontally long orientation D1 and that has slid downward over the package receiving unit 710 is supplied in the horizontally long orientation D1 to the main conveyor MC. It is preferable that the package P rotates not forward but backward, because the force that acts on the package P when the package P rotates and comes into contact with the package receiving unit 710 is smaller when the package P rotates backward than when the package P rotates forward. The reason for this is that, since the angle formed by the rear face of the package P in the vertically long orientation D2 and the package receiving unit 710 (in other words, the distance by which the rear face of the package P moves toward the package receiving unit 710 when the package P in the vertically long orientation D2 rotates backward so as to be in the horizontally long orientation D1) is smaller than the angle between the front face of the package P in the vertically long orientation D2 and the package receiving unit 710 (in other words, the distance by which the front face of the package P moves toward the package receiving unit 710 when the package P in the vertically long orientation D2 rotates forward so as to be in the horizontally long orientation D1), the package P is unlikely to rotate with a strong force.

Furthermore, in this embodiment, if a package P retrieved from a container C is in the vertically long orientation D2, the robot drive controller 550 can instruct the robot apparatus 200 to cancel the holding of the package P, in a state in which the package P that is being held by the holding unit 210 above the package receiving unit 710 is inclined toward a direction that extends along the package receiving unit 710. The term "state in which a package is inclined toward a direction that extends along the package receiving unit (or toward a direction that extends along the inclined table)" is not limited to a case in which the inclination of the package P is substantially the same as the inclination of the package receiving unit 710. It is also possible that the term "state in which a package is inclined toward a direction that extends along the package receiving face" means a state in which the package P is slightly inclined relative to the vertical direction toward a direction that extends along the inclination of the package receiving unit 710. For example, the package P is dropped onto the package receiving unit 710 in a state of being inclined relative to the vertical direction by about 5°.

FIG. 12 is a view illustrating an operation example in which a package P is inclined by the robot apparatus 200. The following operation example is performed under control by the robot drive controller 550. As shown in (a) of FIG. 12, for example, the robot apparatus 200 conveys a package P in the vertically long orientation D2 to a point above the package receiving unit 710 of the inclined table 700. Next, as shown in (b), the robot apparatus 200 slightly inclines the package P that is being held by the holding unit 210, toward a direction that extends along the package receiving unit 710. Next, as shown in (c), the robot apparatus 200 lowers the holding unit 210 such that the package P approaches the package receiving unit 710. When the distance between the package P and the package receiving unit 710 of the inclined table 700 decreases to reach a certain level, the robot apparatus 200 cancels the holding of the package P by the holding unit 210, so that the package P is dropped onto the package receiving unit 710. As shown in (d), the package P reliably rotates backward due to being dropped onto the package receiving unit 710 in a state of being inclined toward a direction that extends along the package receiving unit 710.

Note that the operation example in which a package P is inclined by the robot apparatus 200 is not limited to the above-described example. For example, it is also possible that, after the package P has sufficiently approached the package receiving unit 710, the robot apparatus 200 slightly inclines the package P that is being held by the holding unit 210, toward a direction that extends along the package receiving unit 710. After the package P is inclined toward a direction that extends along the package receiving unit 710, the robot apparatus 200 may drop the package P as is onto the package receiving unit 710.

Furthermore, in this embodiment, it is also possible that, when the orientation of the package P changes to the horizontally long orientation D1, the robot drive controller 550 controls the arm 220 of the robot apparatus 200 so as to rotate the package P to an orientation necessary in advance to position a dimension c that is the smallest among the three dimensions a, b, and c of the package P substantially extending along the vertical direction.

Next, an example of the operation flow of the conveying system 1 of this embodiment will be described.

Figure 13:
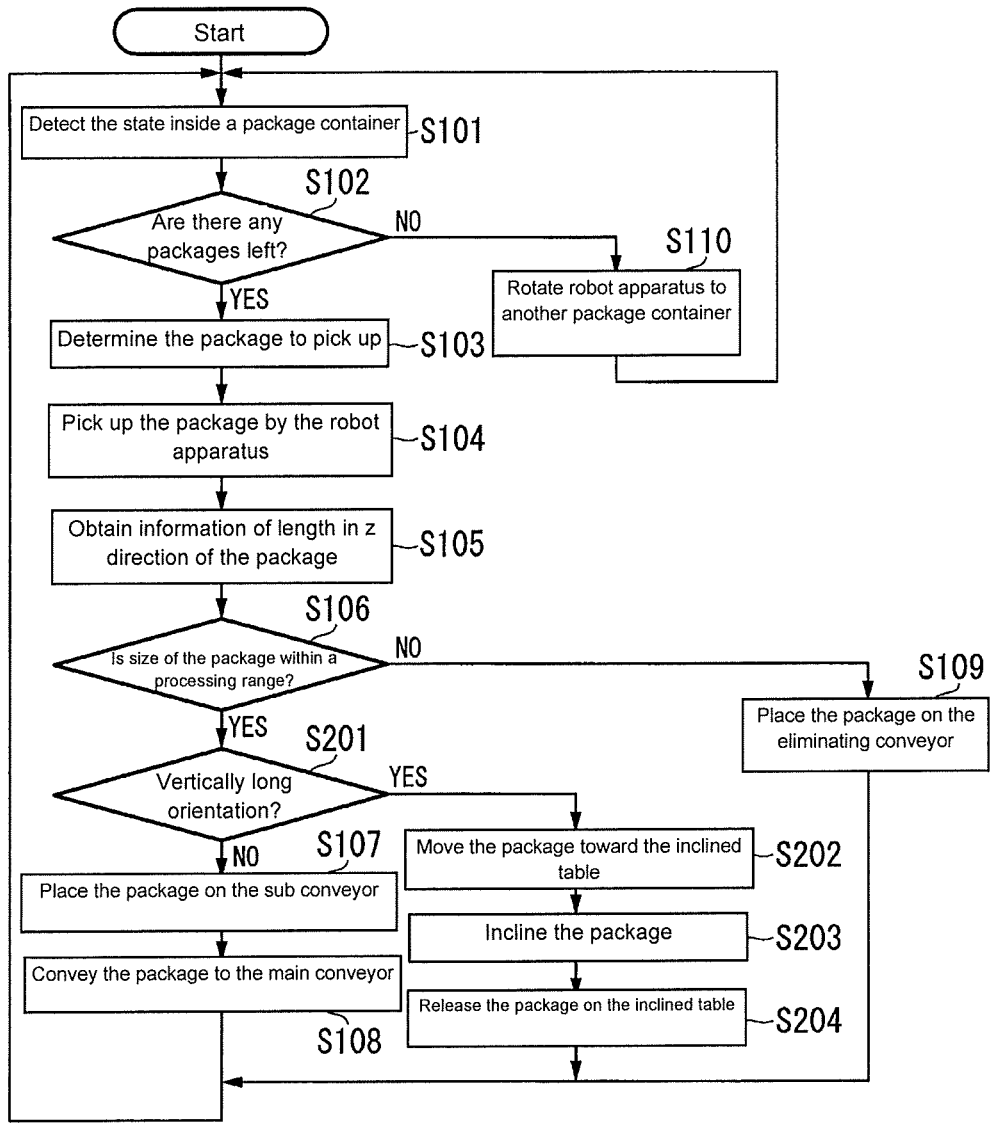
FIG. 13 is a flowchart showing an example of the operation flow of the conveying system of the fifth embodiment.

FIG. 13 is a flowchart showing an example of the operation flow of the conveying system 1 of this embodiment. In FIG. 13, the processing in S101 to S110 is similar to the corresponding processing in the first embodiment.

In this embodiment, when a package P is retrieved (lifted) from a container C, the determining unit 540 of the controller 500 determines whether or not the package P is in the vertically long orientation D2 (satisfies a second condition) (S201). Whether or not the package P is in the vertically long orientation D2 is determined based on the dimensions of the upper face of the package P obtained by capturing an image thereof using the first upper camera 110 (or the second upper camera 130) and analyzing the image using the image analyzing unit 520, and the height dimension of the package P obtained by capturing an image thereof using the first side camera 120 (or the second side camera 140) and analyzing the image using the image analyzing unit 520. The result of the determination as to whether or not the package P is in the vertically long orientation D2 is output from the determining unit 540 to the robot drive controller 550.

If the package P is not in the vertically long orientation D2 (i.e., if the package P is in the horizontally long orientation D1), the robot drive controller 550 performs an operation as in the first embodiment. That is to say, the robot drive controller 550 controls the robot apparatus 200 so as to place the package P retrieved from the container C, on the sub conveyor 300 (S107). The package P placed on the sub conveyor 300 is sent by the sub conveyor 300 onto the main conveyor MC (S108).

On the other hand, if the package P is in the vertically long orientation D2, the robot drive controller 550 controls the robot apparatus 200 so as not to place the package P on the sub conveyor 300. If the package P is in the vertically long orientation D2, the robot drive controller 550 controls the robot apparatus 200 so as to convey the package P to a point above the package receiving unit 710 of the inclined table 700 (S202). Next, the robot drive controller 550 controls the rotation of the arm member included in the arm 220, so that the package P that is being held by the holding unit 210 is slightly inclined toward a direction that extends along the package receiving unit 710 (S203). The robot drive controller 550 cancels the holding of the package P by the holding unit 210, so that the package P is dropped onto the package receiving unit 710 of the inclined table 700 (S204). As a result, the package P rotates from the vertically long orientation D2 to the horizontally long orientation D1, and slides in the horizontally long orientation D1 downward over the inclined table 700 and is supplied to the main conveyor MC.

With the above-described configuration, as in the first embodiment, it is possible to achieve higher conveying speed. Furthermore, in this embodiment, the conveying system 1 further includes the inclined table 700 that is inclined such that the height thereof decreases toward the main conveyor MC. With this inclined table 700, when the package P in the vertically long orientation D2 is dropped onto the package receiving unit 710, the package P rotates from the vertically long orientation D2 to the horizontally long orientation D1, and is supplied in the horizontally long orientation D1 to the main conveyor MC. Accordingly, it is possible to omit the operation that, for example, makes the robot apparatus 200 re-grip the package P in the vertically long orientation D2, thereby changing the orientation to the horizontally long orientation D1. Accordingly, it is possible to achieve higher conveying speed. Moreover, with the inclined table 700, there is no need to substantially modify the main conveyor MC, and thus it is possible to reduce the amount of work involved when installing the conveying system 1.

In this embodiment, if the package P is in the vertically long orientation D2, the robot drive controller 550 of the conveying system 1 instructs the robot apparatus 200 to cancel the holding of the package P, in a state in which the package P that is being held by the holding unit 210 above the package receiving unit 710 is inclined toward a direction that extends along the package receiving unit 710. With this configuration, it is possible to reliably rotate the package P backward. Accordingly, it is possible to prevent an unnecessarily large force from acting on the package P due to the package P rotating forward.

Next, some modifications of the inclined table 700 will be described.

Figure 14:
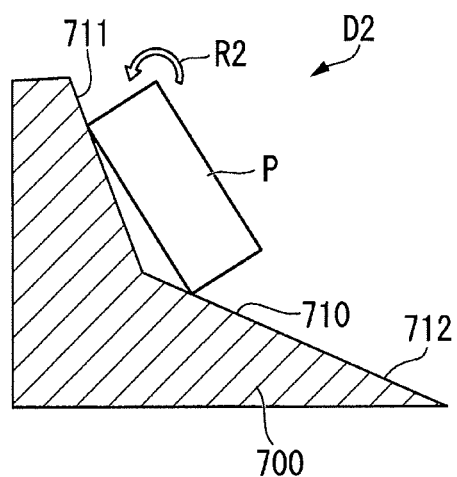
FIG. 14 is a view showing an inclined table of a first modification in the fifth embodiment.

FIG. 14 is a view showing the inclined table 700 of a first modification. As shown in FIG. 14, the package receiving unit 710 of the inclined table 700 of this modification has a first portion (first inclined portion) 711 and a second portion (second inclined portion) 712. The second portion 712 is farther from the main conveyor MC than the first portion 711 is. The inclination of the second portion 712 relative to the horizontal plane is greater than the inclination of the first portion 711 relative to the horizontal plane. With this configuration, when the package P rotates backward, the second portion 712 functions as a stopper, and can reduce the rotational angle of the package P. Accordingly, it is possible to reduce the force that acts on the package P when the package P comes into contact with the package receiving unit 710.

Figure 15:
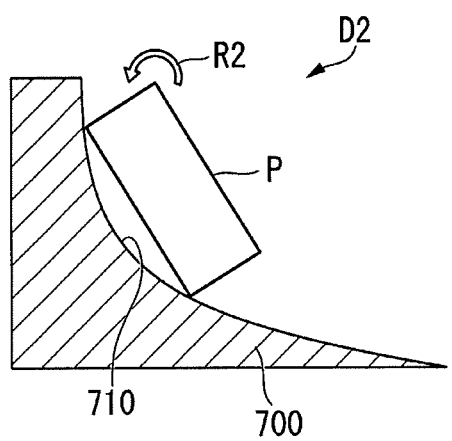
FIG. 15 is a view showing an inclined table of a second modification in the fifth embodiment.

FIG. 15 is a view showing the inclined table 700 of a second modification. As shown in FIG. 15, the package receiving unit 710 of the inclined table 700 of this modification is formed in the shape of an arc projecting diagonally downward. The package receiving unit 710 formed in the shape of an arc is an example of an "arc portion". With this configuration, when the package P rotates backward, the package receiving unit 710 in the shape of an arc functions as a stopper, and can reduce the rotational angle of the package P. Accordingly, it is possible to reduce the force that acts on the package P when the package P comes into contact with the package receiving unit 710. Furthermore, if the package receiving unit 710 is formed in the shape of an arc projecting diagonally downward, it is possible to smoothly change the orientation of the package P from the vertically long orientation D2 to the horizontally long orientation D1.

Figure 16:
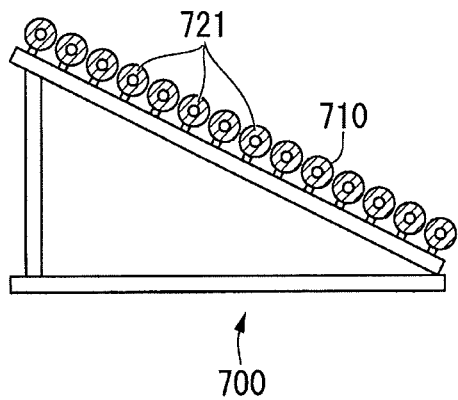
FIG. 16 is a view showing an inclined table of a third modification in the fifth embodiment.

FIG. 16 is a view showing the inclined table 700 of a third modification. As shown in FIG. 16, the package receiving unit 710 of the inclined table 700 of this modification is constituted by a plurality of rollers 721. The rollers 721 are, for example, rollers having no driving force, but may also be rollers that are actively rotated by a driving force supplied thereto.

Figure 17:
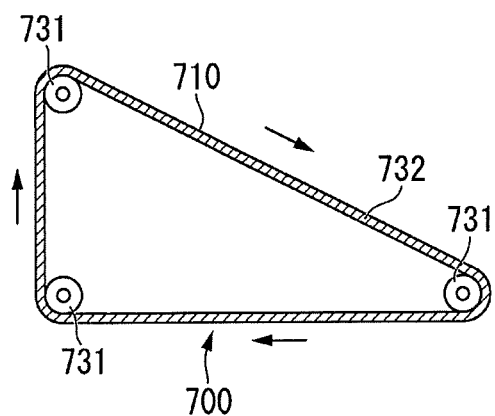
FIG. 17 is a view showing an inclined table of a fourth modification in the fifth embodiment.

FIG. 17 is a view showing the inclined table 700 of a fourth modification. As shown in FIG. 17, the package receiving unit 710 of the inclined table 700 of this modification is constituted by a belt 732 spanned around a plurality of rollers 731. The belt 732 is driven by one or more rollers 731 being actively rotated. The first to fourth modifications may be applied in a combination.

Reference Mode

Next, a reference mode related to the foregoing embodiment will be described. This reference mode is different from the fifth embodiment in that all the packages P retrieved from a container C are dropped onto the package receiving unit 710 of the inclined table 700. The aspects of the configuration other than those described below are as in the fifth embodiment.

Figure 18:
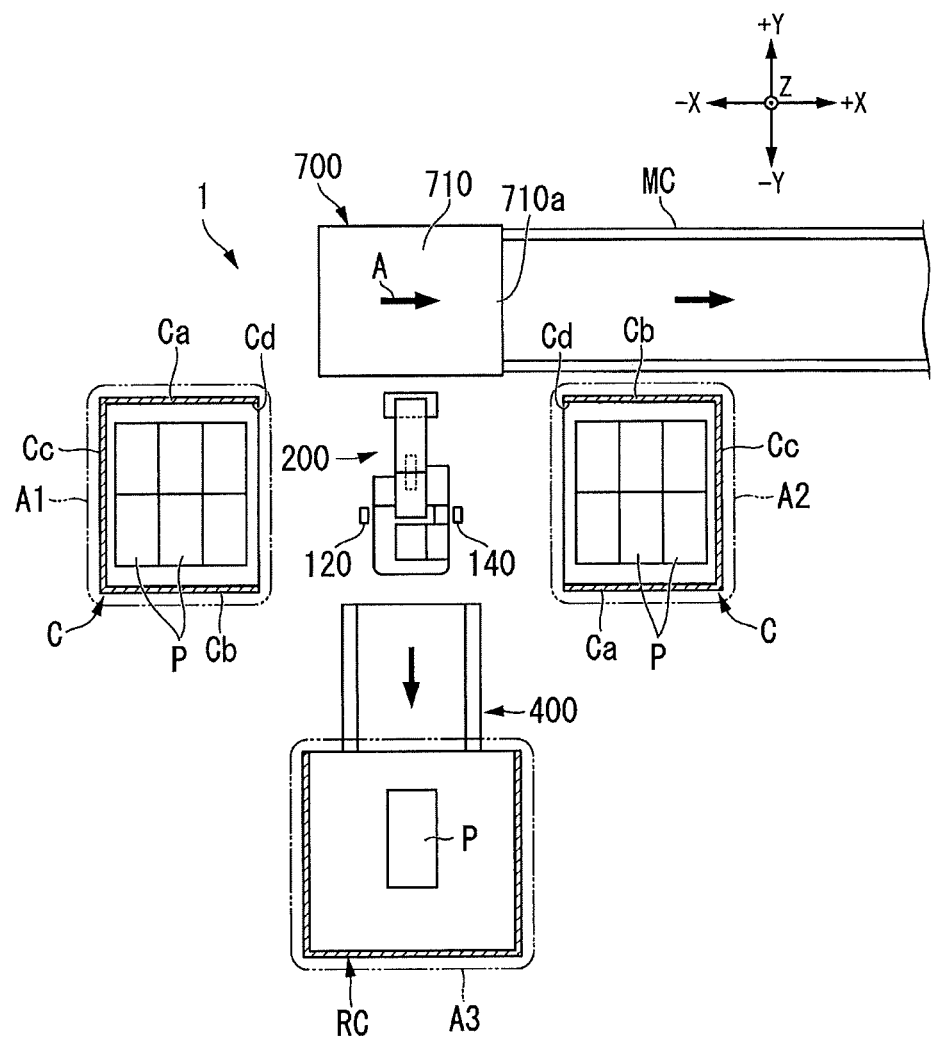
FIG. 18 is a plan view showing a conveying system of a reference mode.

FIG. 18 is a plan view showing the conveying system 1 of this reference mode.

As shown in FIG. 18, in this reference mode, the inclined table 700 is located, for example, above the main conveyor MC, or next to the main conveyor MC in the X direction. The position of the inclined table 700 is not limited to the above-described example. The inclined table 700 may be located at a position similar to that in the fifth embodiment.

Figure 19:
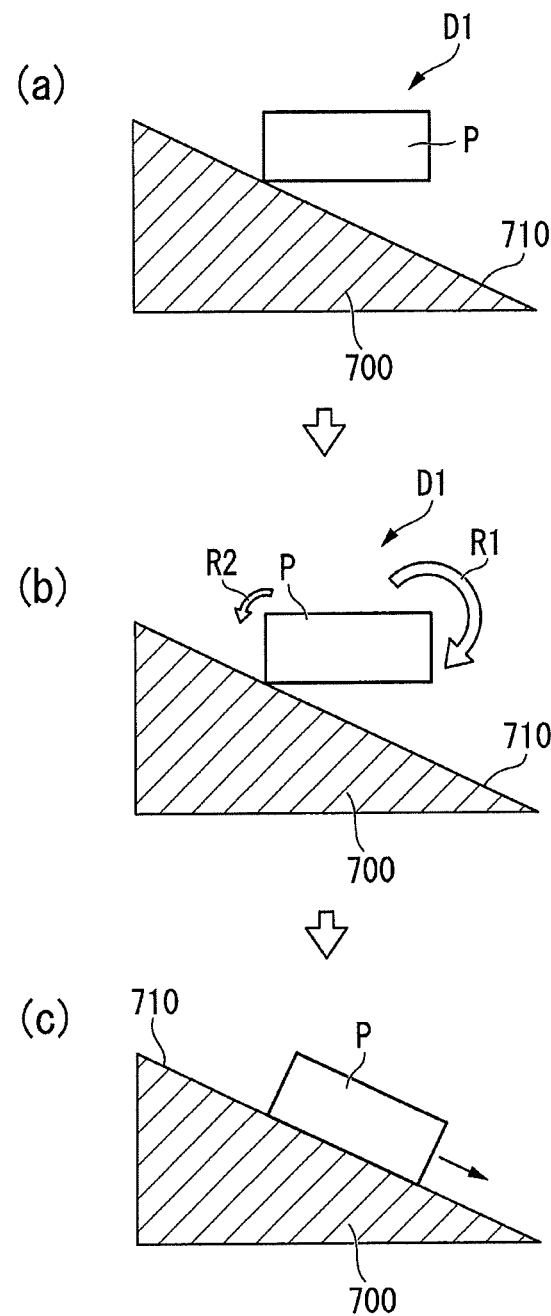
FIG. 19 is a side view showing a behavior of a package in a horizontally long orientation in the reference mode.

In this reference mode, the robot apparatus 200 conveys all of the packages P retrieved from the container C, to a point above the package receiving unit 710 of the inclined table 700, and drops them onto the package receiving unit 710. The behavior when a package P in the vertically long orientation D2 is dropped onto the package receiving unit 710 is as described with reference to FIG. 11. Meanwhile, FIG. 19 shows a behavior when a package P in the horizontally long orientation D1 is dropped onto the package receiving unit 710. As shown in (a) of FIG. 19, when the package P in the horizontally long orientation D1 is placed on the package receiving unit 710 of the inclined table 700, as shown in (b), the force of the package P rotating forward (in the direction indicated by the arrow R1 in FIG. 11) becomes greater than the force of the package P rotating backward (in the direction indicated by the arrow R2 in FIG. 11). As a result, the package P in the horizontally long orientation D1 rotates forward so as to extend along the package receiving unit 710, and, as shown in (c), the package P whose the horizontally long orientation D1 orientation is kept slides downward over the package receiving unit 710. The package P whose horizontally long orientation D1 orientation is kept and that has slid downward over the package receiving unit 710 is supplied in the horizontally long orientation D1 to the main conveyor MC. If the package P is in the horizontally long orientation D1, even when the package P rotates forward, the distance between the package P and the package receiving unit 710 is small. Accordingly, the force that acts on the package P when the package P rotates and comes into contact with the package receiving unit 710 is not large.

Next, an example of the operation flow of the conveying system 1 of this reference mode will be described.

Figure 20:
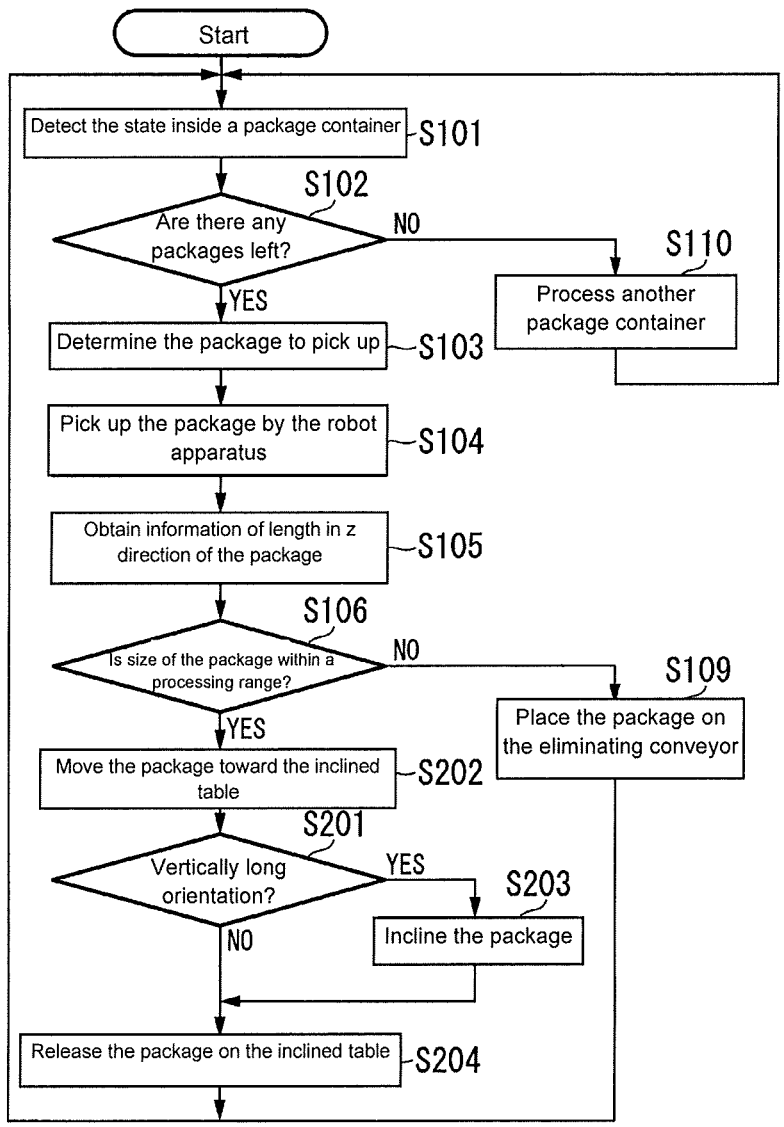
FIG. 20 is a flowchart showing an example of the operation flow of the conveying system in the reference mode.

FIG. 20 is a flowchart showing an example of the operation flow of the conveying system 1 of this reference mode. In FIG. 20, the processing in S101 to S106 and S110 is similar to the corresponding processing in the first embodiment. Furthermore, in FIG. 20, the processing in 5201 to S204 is similar to the corresponding processing in the fifth embodiment. In FIG. 20, for facilitating understanding, the processing in S202 is shown before the processing in S201. Note that either one of the processing in 5201 and the processing in 5202 may be performed prior to the other, or they may be performed in parallel.

As shown in FIG. 20, in this reference mode, if a package P retrieved from the container C is in the horizontally long orientation D1, the robot apparatus 200 drops the package P onto the package receiving unit 710 without inclining it. On the other hand, if a package P retrieved from the container C is in the vertically long orientation D2, as described with reference to FIG. 12, the robot apparatus 200 drops the package P onto the package receiving unit 710 after inclining it.

With the above-described configuration, when the package P in the vertically long orientation D2 is dropped onto the package receiving unit 710 of the inclined table 700, the package P rotates from the vertically long orientation D2 to the horizontally long orientation D1, and is supplied in the horizontally long orientation D1 to the main conveyor MC. Accordingly, it is possible to omit the operation that, for example, makes the robot apparatus 200 re-grip the package P in the vertically long orientation D2, thereby changing the orientation of the package P to the horizontally long orientation Dl. Accordingly, it is possible to achieve higher conveying speed.

In this reference mode, when the inclined table 700 having the package receiving unit 710 in the shape of an arc as shown in FIG. 15 is used, the distance between the package P in the horizontally long orientation D1 and the package receiving unit 710 (the distance of movement of the package P from when rotating forward to when coming into contact with the package receiving unit 710) can be made smaller than, for example, when the inclined table 700 having the package receiving unit 710 in the shape of a straight line as shown in FIG. 19 is used. Accordingly, it is possible to prevent a large force from acting on the package P.

According to at least one of the foregoing embodiments, if a second conveyor is provided that is located next to a robot apparatus, and is configured to convey a package received from the robot apparatus, to a first conveyor, it is possible to achieve higher conveying speed.

The embodiments can be expressed as follows.

(1) A conveying system including:

a robot apparatus having a holding unit configured to hold a package, and an arm configured to move the holding unit, wherein the robot apparatus is located next to a first conveyor extending in a first direction, in a second direction, which is different from the first direction;

a second conveyor located next to the robot apparatus, in the first direction, and configured to convey the package in the second direction toward the first conveyor;

a storage unit configured to store information; and a hardware processor configured to execute a program stored in the storage unit, wherein the storage unit stores the program for causing the hardware processor to execute:

processing for controlling the robot apparatus so as to retrieve the package from a first accumulation unit for the package and place the retrieved package on the second conveyor.

(2) A conveying system including:

a robot apparatus having a holding unit configured to hold a package, and an arm configured to move the holding unit, wherein the robot apparatus is located next to a first conveyor;

a second conveyor configured to convey the package toward the first conveyor;

a storage unit configured to store information; and a hardware processor configured to execute a program stored in the storage unit, wherein the storage unit stores the program for causing the hardware processor to execute:

processing for controlling the robot apparatus so as to retrieve the package from an accumulation unit for the package and place the retrieved package on the second conveyor, and processing for controlling the second conveyor, such that, in a case in which a package satisfies a first condition, the second conveyor is rotated forward, so that the package is conveyed to the first conveyor, and, in a case in which a package does not satisfy the first condition, the second conveyor is rotated in reverse, so that the package is conveyed to a package recovery unit or to a third conveyor extending toward the package recovery unit.

(3) A conveying system including:

a robot apparatus having a holding unit configured to hold a package, and an arm configured to move the holding unit, wherein the robot apparatus is located next to a first conveyor extending in a first direction, in a second direction, which is different from the first direction;

a second conveyor located next to the robot apparatus, in the first direction, and configured to convey the package received from the conveyor, in a direction away from the first conveyor;

a storage unit configured to store information; and a hardware processor configured to execute a program stored in the storage unit, wherein the storage unit stores the program for causing the hardware processor to execute:

processing for controlling the robot apparatus so as to convey the package conveyed by the second conveyor, to an accumulation unit for the package.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveying system comprising:
a robot apparatus having a holding portion configured to hold a package, and an arm configured to move the holding portion, wherein the robot apparatus is located next to a first conveyor extending in a first direction, in a second direction, which is different from the first direction;
a second conveyor located next to the robot apparatus, in the first direction, and configured to convey the package in the second direction toward the first conveyor, the second conveyor being located between a first accumulation portion and the robot apparatus in the first direction;
a third conveyor located next to the robot apparatus, on an opposite side of the second conveyor with respect to the robot apparatus, and configured to convey the package in the second direction toward the first conveyor; and
a controller configured to control the robot apparatus so as to retrieve the package from the first accumulation portion for the package and place the retrieved package on the second conveyor, wherein
the controller controls the robot apparatus so as to retrieve the package from a second accumulation portion for the package and place the retrieved package on the third conveyor,
the third conveyor is located between the second accumulation portion and the robot apparatus in the first direction,
in a case in which the package does not satisfy a first condition, the controller controls the robot apparatus so as to place the package on a package recovery portion, and
in a case in which the package does not satisfy the first condition, the controller controls the robot apparatus so as to place the package on a fourth conveyor extending toward a package recovery portion.

2. The conveying system according to claim 1, wherein, in a case in which the package does not satisfy the first condition, the controller controls the second conveyor such that the second conveyor is rotated in reverse, so that the package placed on the second conveyor is conveyed to a package recovery portion.

3. The conveying system according to claim 1, wherein, in a case in which the package does not satisfy the first condition, the controller controls the second conveyor such that the second conveyor is rotated in reverse, so that the package placed on the second conveyor is conveyed to a fourth conveyor extending toward a package recovery portion.

4. The conveying system according to claim 3, wherein the fourth conveyor is located next to the second conveyor, on an opposite side of the first conveyor with respect to the second conveyor.

5. The conveying system according to claim 1, further comprising:
an inclined table located next to the first conveyor, inclined such that a height thereof decreases toward the first conveyor, and configured such that the package that is to be supplied to the first conveyor is placed on the inclined table.

6. The conveying system according to claim 5, wherein the inclined table has a first portion and a second portion that is farther from the first conveyor than the first portion is, and
an inclination of the second portion relative to a horizontal plane is greater than an inclination of the first portion relative to the horizontal plane.

7. The conveying system according to claim 5, wherein the inclined table comprises an arc portion projecting diagonally downward.

8. The conveying system according to claim 5, wherein, in a case in which the package satisfies a second condition, the controller controls the robot apparatus so as to cancel holding of the package in a state in which the package is inclined toward a direction that extends along the inclined table, above the inclined table.

9. A conveying system comprising:
a robot apparatus having a holding portion configured to hold a package, and an arm configured to move the holding portion, wherein the robot apparatus is located next to a first conveyor;
a second conveyor configured to convey the package toward the first conveyor; and
a controller configured to control the robot apparatus so as to retrieve the package from an accumulation portion for the package and place the retrieved package on the second conveyor, and to control the second conveyor such that, in a case in which a package satisfies a first condition, the second conveyor is rotated forward, so that the package is conveyed to the first conveyor, and, in a case in which a package does not satisfy the first condition, the second conveyor is rotated in reverse, so that the package is conveyed to a package recovery portion.

10. A conveying system comprising:
a robot apparatus having a holding portion configured to hold a package, and an arm configured to move the holding portion, wherein the robot apparatus is located next to a first conveyor;
a second conveyor configured to convey the package toward the first conveyor; and
a controller configured to control the robot apparatus so as to retrieve the package from an accumulation portion for the package and place the retrieved package on the second conveyor, and to control the second conveyor such that, in a case in which a package satisfies a first condition, the second conveyor is rotated forward, so that the package is conveyed to the first conveyor, and, in a case in which a package does not satisfy the first condition, the second conveyor is rotated in reverse, so that the package is conveyed to a third conveyor extending toward a package recovery portion.

11. A conveying system comprising:
a robot apparatus having a holding portion configured to hold a package, and an arm configured to move the holding portion, wherein the robot apparatus is located next to a first conveyor extending in a first direction, in a second direction, which is different from the first direction;
a second conveyor located next to the robot apparatus, in the first direction, and configured to convey the package received from the conveyor, in a direction away from the first conveyor; and
a controller configured to control the robot apparatus so as to convey the package conveyed by the second conveyor, to an accumulation portion for the package.

* * * * *